United States Patent
Billings et al.

(10) Patent No.: US 6,411,458 B1
(45) Date of Patent: Jun. 25, 2002

(54) DISK DRIVE EMPLOYING METHOD OF MONITORING TRANSDUCER FLYING HEIGHT TO RETIRE DEFECTIVE DATA SITE ON RECORDING SURFACE

(75) Inventors: Russell A. Billings; Michael J. Shea, both of Rochester, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/298,363

(22) Filed: Apr. 23, 1999

(51) Int. Cl.$^7$ ............................................... G11B 21/02
(52) U.S. Cl. .......................................... 360/75; 360/25
(58) Field of Search ........................ 360/25, 31, 77.02, 360/75, 53; 324/210, 212; 714/710, 718

(56) References Cited

U.S. PATENT DOCUMENTS

| | | | |
|---|---|---|---|
| 4,777,544 A | | 10/1988 | Brown et al. |
| 5,247,254 A | * | 9/1993 | Huber et al. ............... 360/25 X |
| 5,377,058 A | | 12/1994 | Good et al. |
| 5,410,439 A | | 4/1995 | Egbert et al. |
| 5,412,519 A | * | 5/1995 | Buettner et al. .......... 360/73.03 |
| 5,588,007 A | | 12/1996 | Yiping |
| 5,798,883 A | * | 8/1998 | Kim ............................ 360/31 |
| 5,831,781 A | | 11/1998 | Okamura |
| 5,909,330 A | | 6/1999 | Carlson et al. |
| 6,154,858 A | * | 11/2000 | Ottesen et al. ................ 714/42 |

FOREIGN PATENT DOCUMENTS

| | | |
|---|---|---|
| WO | WO 97/41564 | 11/1997 |
| WO | WO 98/26411 | 6/1998 |

* cited by examiner

Primary Examiner—David Hudspeth
Assistant Examiner—Kin Wong
(74) Attorney, Agent, or Firm—Milad G Shara, Esq.

(57) ABSTRACT

A disk drive employs a method of monitoring a transducer flying height to retire a defective data site on a disk. The transducer is designed to comply with a fly-height specification while flying above the disk. In one aspect, the method includes generating a warning signal representing a condition in which the transducer is flying outside the fly-height specification as a result of flying above a defect site within a physical sector having a physical sector address. The method includes associating the warning signal with a defect site address that points to the defect site and storing the defect site address in a defect discovery table. The method further includes using the defect discovery table to locate the physical sector address. The method includes storing the physical sector address in a defect management table to retire the physical sector. In another aspect, the method includes reading data stored in a data region on the disk to produce a read signal having a first fly-height varying component and a second fly-height varying component. The method further includes generating a warning signal responsive to the first and second fly-height varying components and a threshold value when the transducer means is flying outside the fly-height specification. The method includes retiring the defective data site on the disk in response to the warning signal.

30 Claims, 18 Drawing Sheets

DEFECT DISCOVERY TABLE

| MEMORY LOCATION (238) | DATA SITE LOCATION (240) |
|---|---|
| 0 | D1 |
| M | D2 |
| 2M | P1 |
| 3M | P2 |
| 4M | P3 |
| 5M | P4 |
| 6M | P5 |
| 7M | P6 |
| 8M | P7 |
| 9M | P8 |
| 10M | P9 |

Rows 2M–6M are grouped as 234; rows 7M–10M are grouped as 236.

Fig. 6

DISK DRIVE EMPLOYING METHOD OF MONITORING TRANSDUCER FLYING HEIGHT TO RETIRE DEFECTIVE DATA SITE ON RECORDING SURFACE

CROSS-REFERENCE TO RELATED APPLICATION

This patent application relates to commonly assigned patent application Ser. No. 09/098,318, entitled "Disk Drive Having a Write Condition Detector for Suspending Write Operations While a Transducer Flying Height Deviates from its Operating Flying Height" filed on Jun. 16, 1998, which is herein incorporated by reference.

BACKGROUND OF THE INVENTION

1. Field of the Invention

The present invention relates to a disk drive. More particularly, the present invention relates to a disk drive employing a method of monitoring transducer fly height to retire a defective data site on recording surface.

2. Description of the Related Art

During manufacturing of a disk drive, a defect discovery procedure is performed to detect sites on a disk surface in the disk drive which are defective and thus likely to subsequently cause unrecoverable errors during user operation of the disk drive. These defective data sites are termed "primary defects." After locating the defective data sites, the defect discovery procedure marks them out in a table as defective locations on the disk surface which are not available for use during user operation of the disk drive. The defect discovery procedure includes writing a known data pattern to the disk surface with a transducer head and subsequently reading the data pattern from the disk surface. Defective data sites are identified by comparing the data pattern read from the disk surface with the known data pattern.

In order to statistically reduce the chances of encountering a defective data site after the manufacturing process (and thereby reducing unrecoverable errors reported by the disk drive), disk drive manufacturers commonly include data areas which surround or bound the defective data site as also unusable for storing data, a process known as "padding." It is desirable to pad data sites because a defect (such as a scratch) might cause marginal error performance in data sites close to the defective data sites even though they were not detected during the defect discovery procedure.

Defective data sites which are not identified during manufacturing but encountered during user operation are termed "grown" defects. Many grown defects occur in locations adjacent to defective data sites found during defect discovery. Therefore, padding of the defective data sites also reduces the number of grown defects encountered during user operation, and reduces the chances of reporting an "unrecoverable error" as a result of the grown defect.

Transducer heads in current disk drives are designed to fly at increasingly low flying heights above the disk surface. Despite efforts to improve surface regularity of disk media, tiny irregularities known as anomalies or asperities can remain. These irregularities have a greater effect on a transducer head that is designed to fly closer to the disk surface. For example, anomalies or asparities on the disk surface can cause the transducer head to fly outside of a specified operating fly-height range. When the transducer head flies outside of the specified fly-height range, various problems can occur. For example, data which is being written to the disk surface tends to be unreliable. Furthermore, a high flying transducer head may be affecting or changing data written in adjacent tracks. Although the written data may be subsequently readable, the adjacent tracks may be damaged and unreadable. Also, a read error may occur causing the disk drive to begin a recovery process which can be very time consuming and possibly incapable of recovering the data.

A disadvantage with known defect discovery procedures that are employed during the manufacturing process is that they are not sensitive to a transducer head having a varying flying height which can deviate above the fly-height specification and unreliably write user data during a user operation of the disk drive. For example, although a read signal may appear acceptable during a read operation of the defect discovery procedure, the transducer head may be moving or bouncing around as it passes over a disk anomaly. Notwithstanding such fly-height variations, read channel circuitry in the disk drive may be able to recover the data in the read signal. However, an undetected disk anomaly causing movement (fly-height variations) of the transducer head may subsequently cause the transducer head to unreliably write user data while flying above a high-fly threshold during a user operation of the disk drive.

Various techniques can be used for measuring the flying height of the transducer head. For example, PCT Patent Application No. PCT/US97/19019 to Carlson et al., filed on Oct. 10, 1997, suggests measuring the flying height by using the ratio of the magnitudes of two analog read signal portions having different frequencies. The Carlson PCT patent application further suggests monitoring the flying height by detecting the number of peaks in a read signal to determine whether the head is in a fly-height range during a user write operation of the disk drive. The Carlson PCT patent application discloses postponing the user write operation when the head is detected outside of the fly-height range.

U.S. Pat. No. 4,777,544 to Brown et al. suggests a method and apparatus for in-situ measurement of head/recording medium clearance. A periodic signal is written to the disk surface, and subsequently read back. The flying height of the transducer head is lowered to zero, and a second signal is read back defining a first signal. The first flying height is calculated as a ratio, expressed in decibels, of the first and second signals times the wavelength divided by a constant.

U.S. Pat. No. 5,377,058 to Good et al. suggests fly-height servo control of read/write head suspension. The fly-height of the transducer head is dynamically adjusted to a reference fly-height using a servo loop. The dynamic adjustment of the transducer head fly-height is accomplished using a piezo-electric element.

U.S. Pat. No. 5,410,439 to Egbert et al. suggests a disk file with clearance and glide measurement and early head crash warning. A disk glide test is performed prior to the disk file assembly step in the manufacturing process. The glide test seeks changes in head/disk clearance, reflected by changes in a read back signal. Egbert et al. suggest that such changes may be attributable to irregularities on the disk surface such as aspirates, which can result in catastrophic failure due to head/disk contact. If a glide defect is found, the disk would be replaced due to an almost certain impending head crash.

There is a need for a defect discovery procedure that is sensitive to a transducer head having a varying flying height which can deviate above the fly-height specification and unreliably write user data during a user operation of the disk drive.

SUMMARY OF THE INVENTION

The invention can be regarded as a method of manufacturing a disk drive that includes a transducer means designed to comply with a fly-height specification while flying above a disk. The method includes generating a warning signal representing a condition in which the transducer means is flying outside the fly-height specification as a result of flying above a defect site within a physical sector having a physical sector address. The method includes associating the warning signal with a defect site address that points to the defect site and storing the defect site address in a defect discovery table. The method further includes using the defect discovery table to locate the physical sector address. The method includes storing the physical sector address in a defect management table to retire the physical sector.

The invention can also be regarded as a method of retiring a defective data site on a disk in a disk drive. The disk has a data region for storing data. The disk drive includes a transducer means designed to comply with a fly-height specification while flying above the disk. The method includes reading the data stored in the data region to produce a read signal having a first fly-height varying component and a second fly-height varying component. The method further includes providing a threshold value and generating a warning signal responsive to the first and second fly-height varying components and the threshold value when the transducer means is flying outside the fly-height specification. The method includes retiring the defective data site on the disk in response to the warning signal.

The invention can also be regarded as a disk drive including a disk having a data region for storing data and a transducer means designed to comply with a fly-height specification while flying above the disk. The transducer means reads the data to produce a read signal having a first fly-height varying component and a second fly-height varying component. This disk drive includes means for providing a threshold value and means for generating a warning signal responsive to the first and second fly-height varying components and the threshold value when the transducer means is outside the fly-height specification. The disk drive further includes means responsive to the warning signal for retiring a defective data site on the disk.

BRIEF DESCRIPTION OF THE DRAWINGS

FIG. 6 is a table representative of a defect discovery table in accordance with an embodiment of the present invention.

DETAILED DESCRIPTION OF THE PREFERRED EMBODIMENTS

Figure 1:
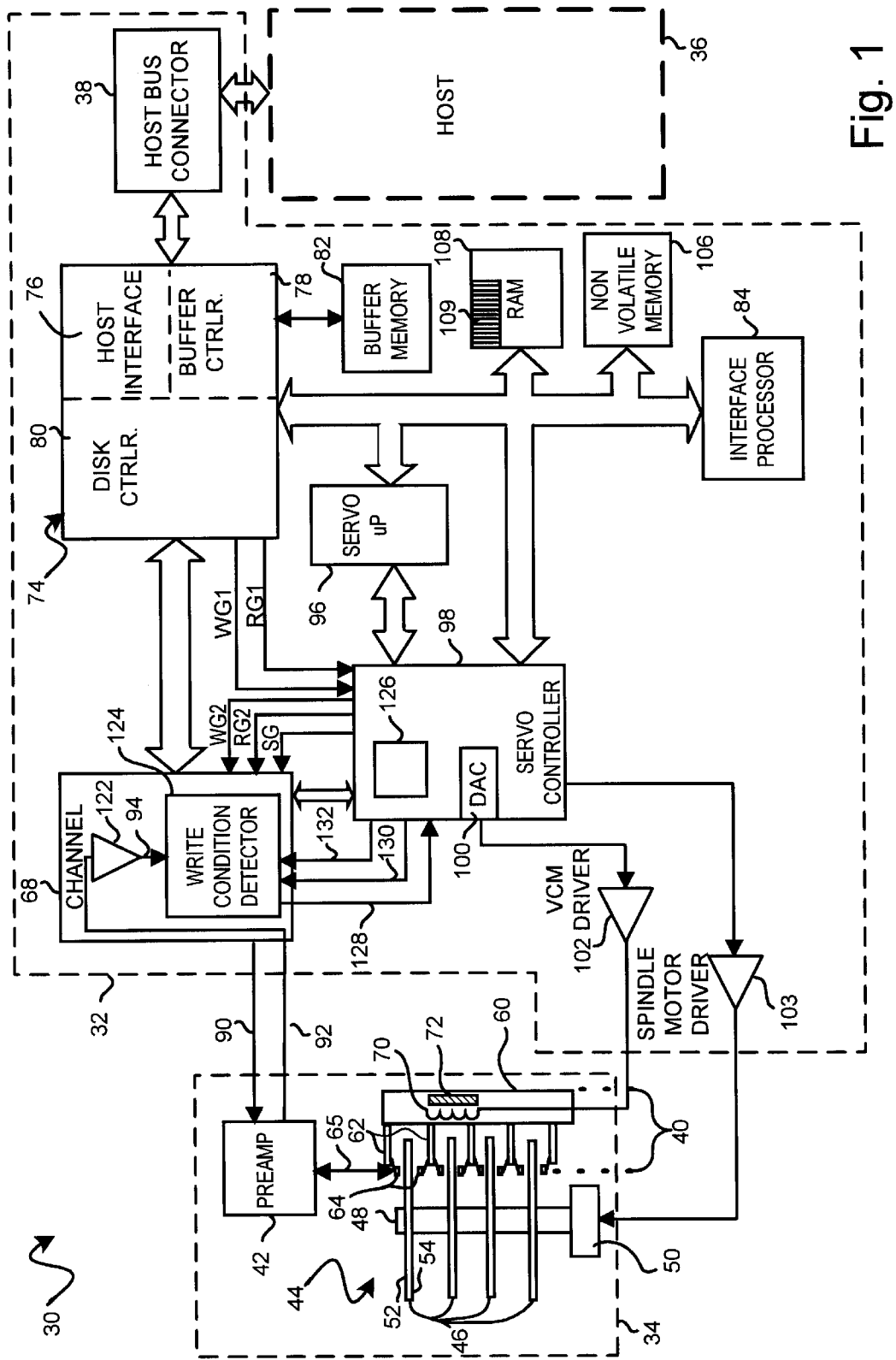
FIG. 1 is a block diagram of a disk drive according to an embodiment of the present invention.

A hard disk drive according to an embodiment of the present invention is illustrated generally at 30 in FIG. 1. Disk drive 30 preferably employs a fly-height detector, such as write condition detector 124, to monitor the flying-height of a transducer head, such as transducer head 64, and locate defective data sites on a disk surface, such as disk surface 52, during a "fly-height defect discovery procedure" of the manufacturing process and/or user operation. In another embodiment, the fly-height defect discovery procedure can be used together with other non-fly height defect discovery procedures for locating defective data sites on the disk surface.

Disk drive 30 includes a disk control system 32 and a head disk assembly (HDA) 34. Disk control system 32 includes circuitry and processors which provide an intelligent disk control system interface between a host system 36 and HDA 34 for execution of read and write commands. Host system 36 can include a microprocessor based data processing system such as a personal computer, or other system capable of performing a sequence of logical operations. Data is transmitted between host system 36 and disk control system 32 via a host bus connector 38.

HDA 34 includes an actuator assembly 40, a preamplifier 42, and a disk assembly 44. Disk assembly 44 includes one or more magnetic media disks, such as indicated at 46. Disks 46 are stacked on a spindle assembly 48. Spindle assembly 48 is mechanically coupled to a spindle motor 50 for rotating disks 46 at a high rate of speed. Each disk 46 includes up to two disk recording surfaces (i.e., disk surfaces) capable of storing data thereon, such as indicated at 52 and 54.

Actuator assembly 40 includes a voice coil motor (VCM) 60 and multiple actuator arms 62 extending from VCM 60. Each actuator arm 62 corresponds to a respective disk surface, such as disk surface 52 and 54. A transducer head 64 (i.e., transducer means) is disposed at the end of each actuator arm 62, and each transducer head 64 is associated with a corresponding disk surface 52, 54. Transducer heads 64 communicate with disk control system 32 via preamplifier 42 for reading and writing data to the associated disk surface 52, 54. Preamplifier 42 is electrically coupled to transducer head 64 by connecting means, indicated at 65, for receiving and recording signals which are representative of magnetic transitions on a selected disk surface 52, 54. Preamplifier 42 provides an amplified signal to a read/write channel 68 of disk control system 32. The read/write channel 68 performs a coding and decoding of data written to and read from the disks 46. The read/write channel 68 is described in detail further in this specification. VCM 60 includes a coil 70 moving in proximity to a permanent magnet 72. Actuator arms 62 are permanently coupled to VCM 60. VCM 60 controllably swings actuator arm 62 and their corresponding transducer heads 64 back and forth over their associated disk surface 52, 54 to access target data tracks formed on the associated disk surface.

Disk control system 32 includes an integrated circuit host interface and disk controller (HIDC) 74 having a host interface 76, a buffer controller 78 and a disk controller 80. Host interface 76 communicates with host system 36 via host bus connector 38 by receiving commands and data from and transmitting status and data back to host system 36. Buffer controller 78 controls a buffer memory 82 employed for storing data from host system 36 which is to be written to a disk surface (e.g., disk surface 52). In addition, buffer controller 78 controls buffer memory 82 for storing data read from disk surface 52. Host interface 76 provides for the data to be transmitted to and from the host system. Buffer memory 82 typically comprises random access memory (RAM), such as dynamic random access memory (DRAM). Disk controller 80 sends data to and receives data from read/write channel 68. Disk controller 80 also provides for error correction and error detection on data read from a disk surface.

An interface processor 84 handles the flow of data commands received by host interface 76 by sending commands to and reading status from disk controller 80. Interface processor 84 ascertains which commands to process from host system 36 and when to process these commands, and directs other tasks performed by disk controller 80.

Read/write channel 68 is coupled to preamplifier 42, indicated by read lines 90 and write lines 92. During a read operation, preamplifier 42 amplifies the transition pulses that are detected by a transducer head 64 associated with a disk surface and amplifies them to a signal level that can be processed by read/write channel 68. Read/write channel 68 receives the magnetic transition pulses read from the disk surface and further amplifies, filters and converts the transition pulses into digital data which is output to disk controller 80. During a write operation, the read/write channel 68 receives data from disk controller 80 and converts the data into pulses for writing data to a disk surface via write lines 92 and preamplifier 42. Preamplifier 42 generates current to drive the transducer head to write transitions on the disk surface.

A servo processor 96 commands a servo controller 98 to control the position of transducer head 64 over disk 46 at a target data track for subsequent execution of read or write commands. Servo processor 96 receives a representative form of a position signal sensed by transducer head 64, via preamplifier 42 and read/write channel 68 and performs calculations to position transducer head 64 relative to its associated disk surface. A digital signal-to-analog converter (DAC) 100 in servo controller 98 responds to digital commands from servo processor 96 to provide a corresponding analog signal to VCM driver 102. VCM driver 102 responds to the analog signal from DAC 100 to provide a corresponding current to VCM 60. The current from VCM driver 102 is provided to coil 70 of VCM 60 and causes movement of actuator assembly 40 which in turn causes the attached actuator arms 62 to swing and thereby move transducer head 64 over an associated disk surface 52, 54 to access target data tracks. Servo processor 96 also provides commands to servo controller 98 to control the rotational velocity of spindle motor 50. Servo processor 98 controls the rotational velocity of spindle motor 50 via servo controller 98 and a spindle motor driver 103 to maintain a substantially constant operational rotational velocity of rotating disks 46.

Disk control system 32 further includes read gate RG1 and write gate WG1 electrically coupled between disk controller 80 and servo controller 98. Read gate RG2 and write gate WG2 are electrically coupled between servo controller 98 and read/write channel 68. Read gates RG1 and RG2 must be asserted for reading of data from a disk surface through read/write channel 68. Similarly, write gates WG1 and WG2 must be asserted before writing of data occurs on a disk surface through read/write channel 68. Servo gate signal SG is enabled when reading servo data from a servo sector located on a disk surface. Also, read gate RG1 or write gate WG1 may be asserted, but servo controller 98 may prohibit the reading or writing of data. For example, when writing data to a disk surface, interface processor 84 may command disk controller 80 to write multiple blocks of data to a data region or series of data sectors on a disk surface, but servo controller 98 may prohibit writing by not enabling write gate WG2 if the transducer head is not on track with the desired target track.

Disk drive control system (including servo system) operational programs are stored in non-volatile memory 106, which may be read-only memory (ROM) or flash memory, and are loaded into RAM 108 for execution. Alternatively, system operational programs may be stored on reserve cylinders on disk 46. Upon startup of hard disk drive 30, disk drive programs, such as the servo system operational programs, are transferred into RAM 108 for fast access by servo processor 96 for positioning transducer head 64 for execution of read and write commands.

In an exemplary operation of disk drive 30, servo processor 96 receives a command to position actuator assembly 40 for accessing data or writing data on a specific target data track on a disk surface 52 or 54. In operation of disk drive 30, disk controller 80 keeps track of where transducer head 64 is passing over data sectors and servo sectors and servo processor 96 keeps track of which circular data track or "cylinder" of data tracks the transducer head is over, and keeps the transducer head tracking or following on the desired target data track.

The current circular data track position of transducer head 64 is stored in RAM 108 to permit servo processor 96 to determine a required seek distance between the current data track and a target data track on disk 46. Based on the required seek distance, servo processor 96 retrieves a corresponding read or write seek profile from RAM 108 and provides a digital signal command to DAC 100 corresponding to the seek profile. DAC 100 provides a corresponding analog signal to VCM driver 102 representative of the seek profiles. VCM driver 102 provides a current output to coil 70 of VCM 60 for acceleration and/or deceleration of actuator arm 62 to perform a seek operation to move transducer head 64 from the current data track to the target data track. As actuator arm 62 moves from the current data track to the target data track, position information is received through the sensing of the servo sectors or "wedges" disposed on disk surface 52 or 54. Based on this position information, a position signal is provided via preamplifier 42, read/write channel 68, and servo controller 98 to servo processor 96 to provide a representative position of transducer head 64 relative to its associated disk surface 52 or 54. Upon completion of a seek operation and the corresponding alignment of transducer head 64 over the target data track, a read or write command is executed to read data from or write to the target data track.

Defect Discovery

According to one embodiment, a fly-height defect discovery procedure preferably employs a fly height detector shown as write condition detector 124 to determine whether transducer head 64 has deviated from a fly-height specification. Alternatively, other fly-height detectors can be used for determining whether transducer head 64 has deviated from the fly-height specification. In operation, write condition detector 124 receives read signal 94 from AGC 122 representative of the flying height of transducer head 64 above disk surface 52. If transducer head 64 is outside a fly-height specification, a warning signal via write condition signal 128 is asserted, and registered in write condition register 126. In response to the warning signal being asserted, the fly-height defect discovery procedure includes retiring a defective data site on disk surface 52.

Figure 2:
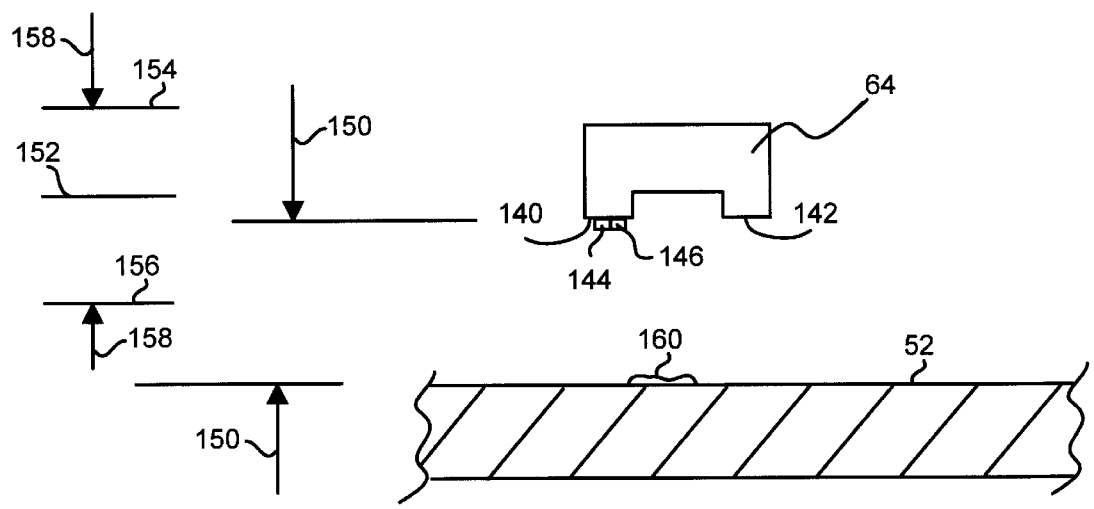
FIG. 2 is a partial elevational view illustrating a transducer head positioned above a disk surface in the disk drive of FIG. 1.

In FIG. 2, transducer head 64 is shown positioned above disk surface 52 (shown in partial sectional view) during the fly-height defect discovery procedure in accordance with an embodiment of the present invention. As disk surface 52 rotates below transducer head 64, transducer head 64 flies on an air-bearing created by the relative motion between disk surface 52 and transducer head 64. In particular, transducer head 64 includes first air-bearing surface 140, second air-bearing surface 142, read element 144 and write element 146 (partially shown).

The distance between air-bearings surfaces 140, 142, and disk surface 52 is referred to as the "fly-height" of transducer head 64, indicated at 150. Transducer head 64 is suitably designed to fly close to the spinning disk surface 52 (e.g., 1.2 microinches). In particular, transducer head 64 has a nominal fly-height 152, a high-fly threshold 154 and a low-fly threshold 156. The range between high-fly threshold 154 and low-fly threshold 156 is defined as a fly-height specification 158 for transducer head 64.

During the manufacturing process, defective data sites on the disk surface 52 (e.g., which may contain anomalies or asperities) which may cause the transducer head 64 to fly outside of the fly-height specification 158 are identified using the fly-height defect discovery procedure in accordance with an embodiment of the present invention. By identifying such defects using the fly-height defect discovery procedure, subsequent "unrecoverable errors" during user operation of the disk drive 30 due to such defects can be avoided.

Figure 3:
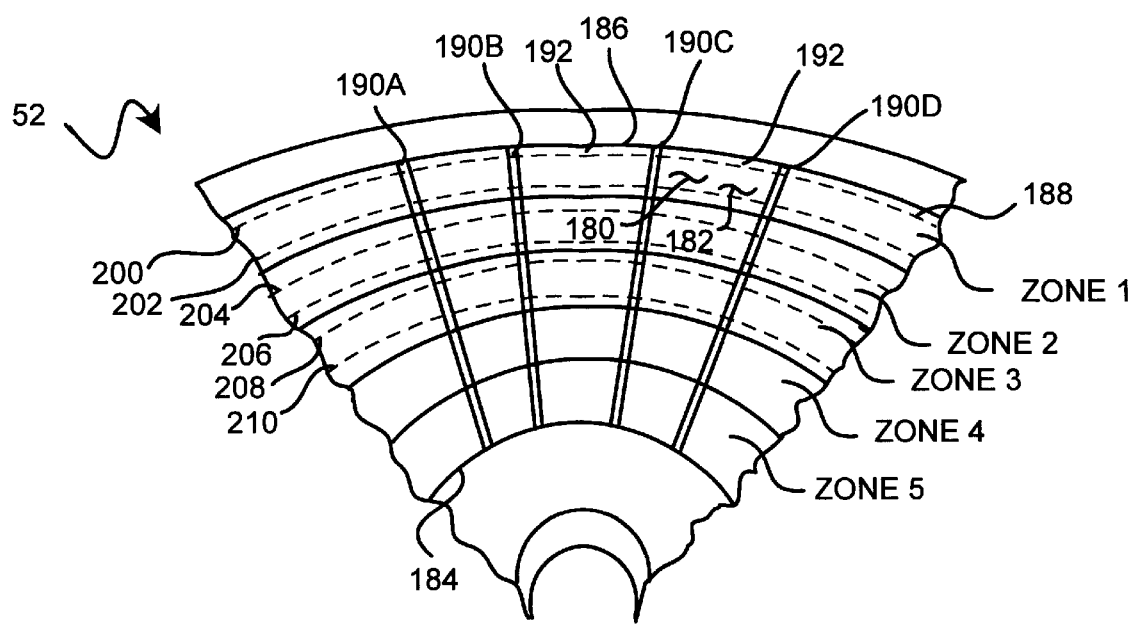
FIG. 3 is a partial plan view of the disk surface having defective data sites which are identified during a fly-height defect discovery procedure in accordance with an embodiment of the present invention performed during manufacturing of the disk drive of FIG. 1.

FIG. 3 is a partial plane view illustrating a disk surface (e.g., disk surface 52) having defective data sites, prior to formatting data sectors on the disk surface. For example, the defective data sites identified using the fly-height defect discovery process are indicated at 180 and 182 (shown enlarged). Disk surface 52 includes an inner boundary 184 and an outer boundary 186 defining an annular area suitable for the recording and reproduction of data. Data is stored on concentric tracks, such as indicated by 188, between inner boundary 184 and outer boundary 186. Once formatted, recorded information (i.e., user data) on the disk surface 52 is divided into regions or groups of data sectors. Embedded servo information is recorded in the servo sectors or servo "wedges" placed in radially continuous narrow regions (termed "servo sectors") indicated at 190A, 190B, 190C and 190D located between data sites or segments 192. Servo information is contained in the servo sectors 190A, B, C, D in a number of fields. Such fields may include a field for automatic gain control/phase-lock oscillator initialization, a timing information/bit synchronization field (e.g., a servo sync word), a track identification field having the address of the track and servo bust fields for positioning (i.e., centering) a transducer head over a data track.

Using zone recording techniques, groups of adjacent data tracks are assigned to a plurality of zones between the inner boundary 184 and the outer boundary 186. The disk surface 52 shown has been partitioned into 5 physical zones, illustrated by zone boundaries 196, labeled ZONE 1, ZONE 2, ZONE 3, ZONE 4 and ZONE 5. Disk surface 52 may be partitioned into any desirable, usable number of zones, which more typically, ranges between 10 and 16 zones. The establishment of zones allows for an efficiency in recording by varying recording frequencies (and other control parameters) to maintain approximately constant linear bit density across the disk as is known in the art. Further, each zone may be divided into one or more designated partitions wherein each partition includes a number of spare data sectors or data tracks.

If a disk defect is detected using the fly-height defect discovery process after formatting, a defect management scheme (e.g., a push-down or reassignment scheme) can be employed for marking the defective data sector, reallocating the remaining data sectors within the data partition, and using one of the spare sectors.

For each ZONE 1, 2, 3, 4, 5 on disk surface 52, a number of test tracks are designated for computing high-fly and low-fly threshold zone coefficients used by an embodiment of the fly-height defect discovery procedure in accordance with an embodiment of the present invention. The zone coefficients are utilized for subsequent computation of the high-fly threshold 154 and the low-fly threshold 156. For example, for ZONE 1 test tracks 200 and 202 are identified. For ZONE 2 test tracks 204 and 206 are identified. For ZONE 3 test tracks 208 and 210 are identified. These tracks are chosen at the beginning and end of each zone and define which tracks will be used to determine zone coefficients during manufacturing of disk drive 30. The zone coefficients are used in a linear or higher order approximation of the high-fly threshold 154 and low-fly threshold 156 value that is a function of track number for each head/disk surface combination in disk drive 30. The zone coefficients may be created for either the user data zones or the servo zones or another number of zones unrelated to the number of user data zones or servo zones.

A process in accordance with an embodiment of the present invention for computing zone coefficients for disk drive 30 is discussed later in this specification. Further, a process for computing a high-fly threshold based on the zone coefficients is also discussed later in the specification.

The servo sectors are written to the disk surface 52 using a servo writing process. The fly-height defect discovery procedure in accordance with an embodiment of the present invention is employed to identify defective data sites on the disk surface 52 and to pad the regions bounding the defective data sites, termed "marginal data sites", prior to formatting of the disk surface.

Prior to formatting, data sites within each data segment are identified by cylinder number, head and offset from a servo wedge. After the disk is formatted, data sites are translated or mapped to sector addresses (physical sector addresses). The defect discovery table is used while formatting the disk surface to generate a defect management table identifying the data sectors (physical sectors) associated with the defective data sites and the marginal data sites, and are not available for use during user operation of the disk drive.

Figure 4:
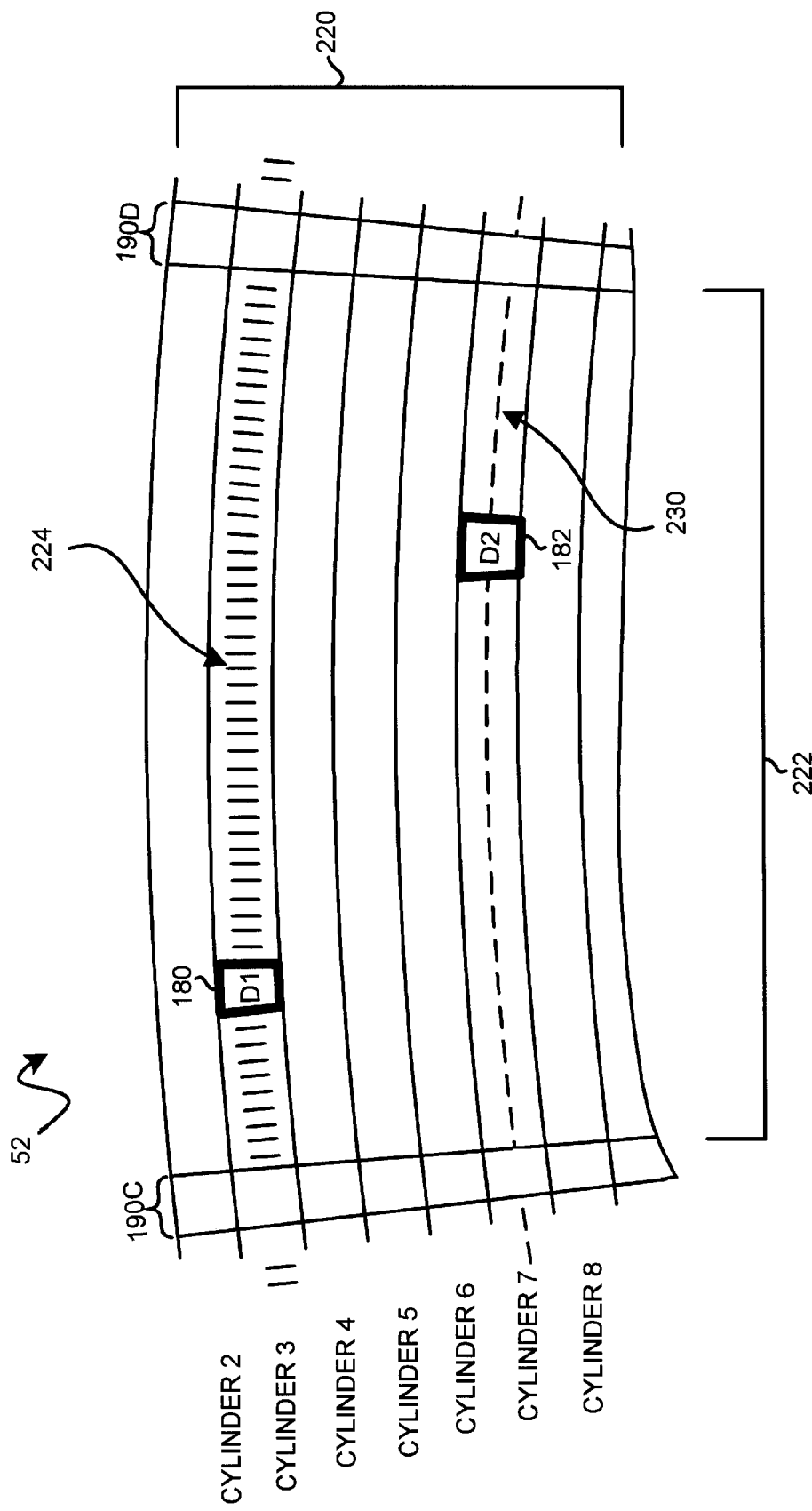
FIG. 4 is an enlarged partial plan view of a disk surface having defective data sites identified using a fly-height defect discovery procedure in accordance with an embodiment of the present invention.

In FIG. 4, partition 220 is shown representing a portion of ZONE 1 shown in FIG. 3. Disk surface 52 is shown during the defect discovery process in manufacturing in accordance with an embodiment of the present invention, after the servo sectors have been written to the disk surface 52. The portion of partition 220 shown includes CYLINDER 2, CYLINDER 3, CYLINDER 4, CYLINDER 5, CYLINDER 6, CYLINDER 7 AND CYLINDER 8. Disk surface 52 is associated with transducer head 0 (i.e., transducer head 64). The disk surface 52 includes defective data site 180, indicated at D1, and defective data site D2, indicated at 182. In the partial plan view shown, data region 222 is located between servo section 190C and servo sector 190D.

In accordance with an embodiment of the fly-height defect discovery procedure, a known (raw) data pattern is written on the disk surface 52 via transducer head 0 without appending ECC redundant data. Preferably, the data pattern is a periodic data pattern, represented by periodic transitions 224. The periodic data pattern 224 is subsequently read from the disk surface 52, via transducer head 64. As the periodic transitions 224 are read from the disk surface 52, the fly-height defect discovery process includes the step of identifying data site D1 as a defective data site 180 due to the transducer head 64 flying outside of the fly-height specification 158. In one embodiment, the fly-height defect discovery procedure employs write condition detector 124 to detect transducer head 64 flying outside the fly-height specification 158. Defective data site D1 causes transducer head 64 to fly above high-fly threshold 154. One preferred embodiment for write condition detector 124 is discussed in detail later in the specification.

Other methods of defect discovery can also be performed on disk surface 52. In one embodiment, a non-fly height defect discovery procedure is performed on disk surface 52 wherein a known data pattern, indicated by dashed line 230, is written to the disk surface 52. The written data pattern 230 is subsequently read back and compared to the known data pattern for identification of defective data sites, such as defective data site D2 (indicated at 182).

According to one embodiment, the fly-height defect discovery procedure preferably includes the steps of (1) reading data in a data region, such as automatic gain control or servo burst information stored in servo sectors 190A–190C, to generate a read signal, such as a read signal 94, having first and second fly-height varying components; (2) generating a warning signal, such as write condition signal 128, responsive to the fly-height varying components and a high-fly threshold, such as high-fly threshold 154, when the flying height of transducer head 64 deviates above the high-fly threshold; and (3) retiring a defective data site, such as defective data site D1 on disk surface 52, in response to the warning signal.

Figure 5:
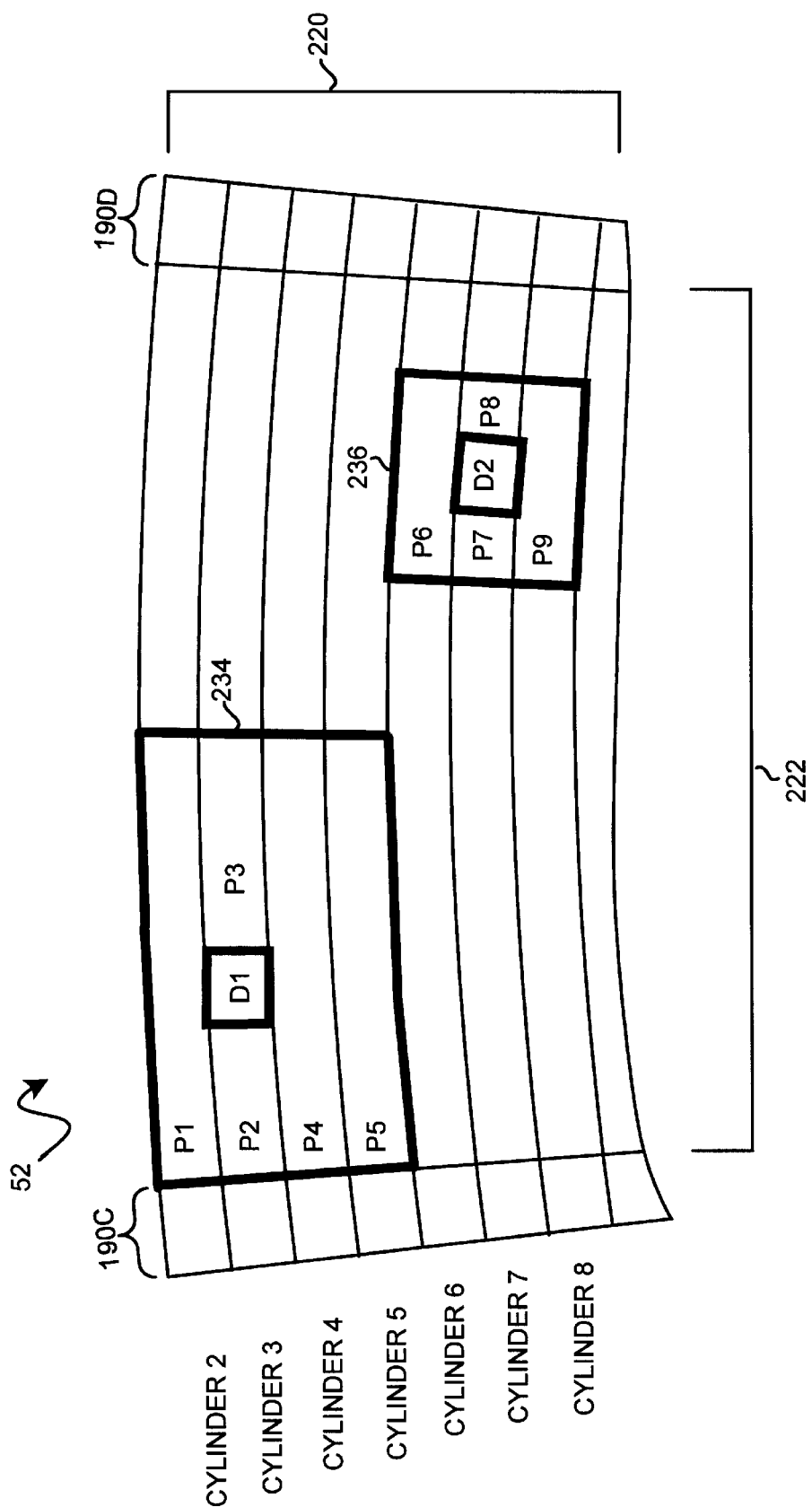
FIG. 5 is an enlarged partial plan view of a disk surface having "padded" defective data sites using a fly-height defect discovery procedure in accordance with an embodiment of the present invention.

Referring to FIG. 5, once a defective data site is identified, a padding procedure is preferably employed in order to statistically reduce the chances of encountering a defective data site after the manufacturing process (and thereby reducing unrecoverable errors reported by the disk drive during user operation). The phrase "pad the defective data site" refers to the procedure of marking out data areas based on their proximity to the defective date site (e.g., which surround or bound the defective data site) as also unusable for storing data. Depending on the size of the defective data site, the defective data site may be "padded" both circumferentially and/or radially.

In one embodiment, defective data site D1 identified during the fly-height defect discovery process and defective data site D2 identified during the non-fly height defect discovery process are padded in a similar manner. In another exemplary embodiment shown, defective data site D1 identified in the fly-height defect discovery process is padded differently than the defective data site D2 identified during the non-fly height defect discovery process. In one preferred embodiment, defective data site D1 is padded more aggressively than defective data site D2, due to the determination that the defect associated with defective data site D1 causes the transducer head 64 to fly outside of the fly-height specification.

The padding of defective data site D1 is indicated at 234, and the padding of defective data site D2 is indicated at 236. In particular, defective data site D1 is bounded by marginal data sites P1, P2, P3, P4 and P5. Specifically, defective data site D1 is circumferentially padded with marginal data site P2 and marginal data site P3. Defective data site D1 is radially padded with marginal data site P1, marginal data site P4 and marginal data site P5 on adjacent cylinders. The marginal data sites are selected based on their proximity to the defective data site D1.

Defective data site D2 is padded less aggressively than defective data site D1, being bounded by marginal data sites P6, P7, P8 and P9 which are chosen to be shorter in length or smaller than the marginal defective data sites associated with defective data site D1. Specifically, defective data site D2 is circumferentially padded by marginal data site P7 and marginal data site P8. Defective data site D2 is radially padded by marginal data site P6 and marginal data site P9.

The defective data sites D1 and D2, and the marginal data sites 234, 236 are listed in a table. The table may be termed a defect discovery table or prior defect table. The defective data sites and marginal data sites may be variable in length and are identified by head, cylinder and location of a contiguous bit or byte within a data region, and referenced to a servo wedge.

In FIG. 6, a defect discovery table is shown. Column 238 indicates the relative memory location for each table entry, and column 240 indicates the data site location (defect site address) stored at the corresponding memory location. In one embodiment, the information stored at each memory location identifies the data site by cylinder number, head number, servo sector number, data site start byte and length of the identified data site. The information in the defect discovery table is used while formatting the disk surface 52 to locate data sectors (physical sectors) that will be entered in a defect management table.

In the exemplary embodiment shown, defective data site D1 location is stored at memory location 0; defective data site D2 is stored at memory location M (where M is defined as the length in memory locations of an entry). Similarly, data site P1 is stored at memory location 2M, P2 is stored at memory location 3M, P3 is stored at memory location 4M, P4 is stored at memory location 5M, P5 is stored at memory location 6M, P6 is stored at memory location 7M, P7 is stored memory location 8M, P8 is stored at memory location 9M and P9 is stored at memory location 10M.

Figure 7:
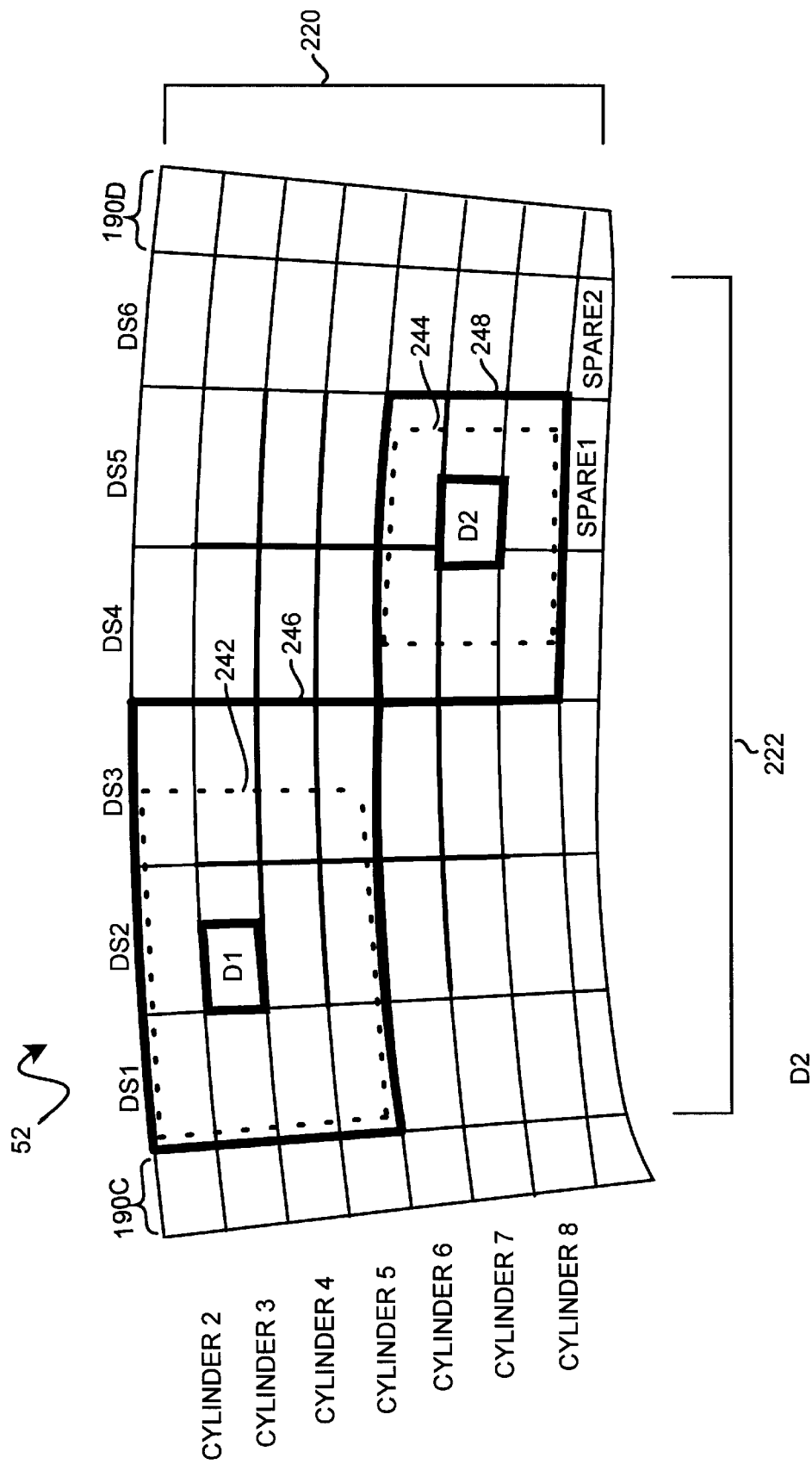
FIG. 7 is an enlarged partial plan view of the disk surface of FIG. 5 showing the relationship of the defective data sites and pad locations to data sector boundaries.

In FIG. 7, a portion of disk surface 52, partition 220 is illustrated after formatting. The defect discovery table is used in formatting the disk surface 52, including identifying defective data sites on the disk surface. In one embodiment, six data sectors are located in each cylinder 2–8, between servo sector 1 90C and servo section 190D for each cylinder, indicated as data sectors DS1, DS2, DS3, DS4, DS5 and DS6. Dashed lines 242, 244 show the marginal data site boundaries identified during the defect discovery procedure (234, 236) to bound defective data sites D1 and D2. Solid bold line 246, 248 outline data sector boundaries encompassing the marginal data sites 234, 236.

Also shown in partition 220 are data sectors SPARE 1 and SPARE 2, part of a pool of spare sectors which have been allocated as spare data sectors available for use as part of a defect management scheme, such as a push-down scheme as known in the art.

Figure 8:
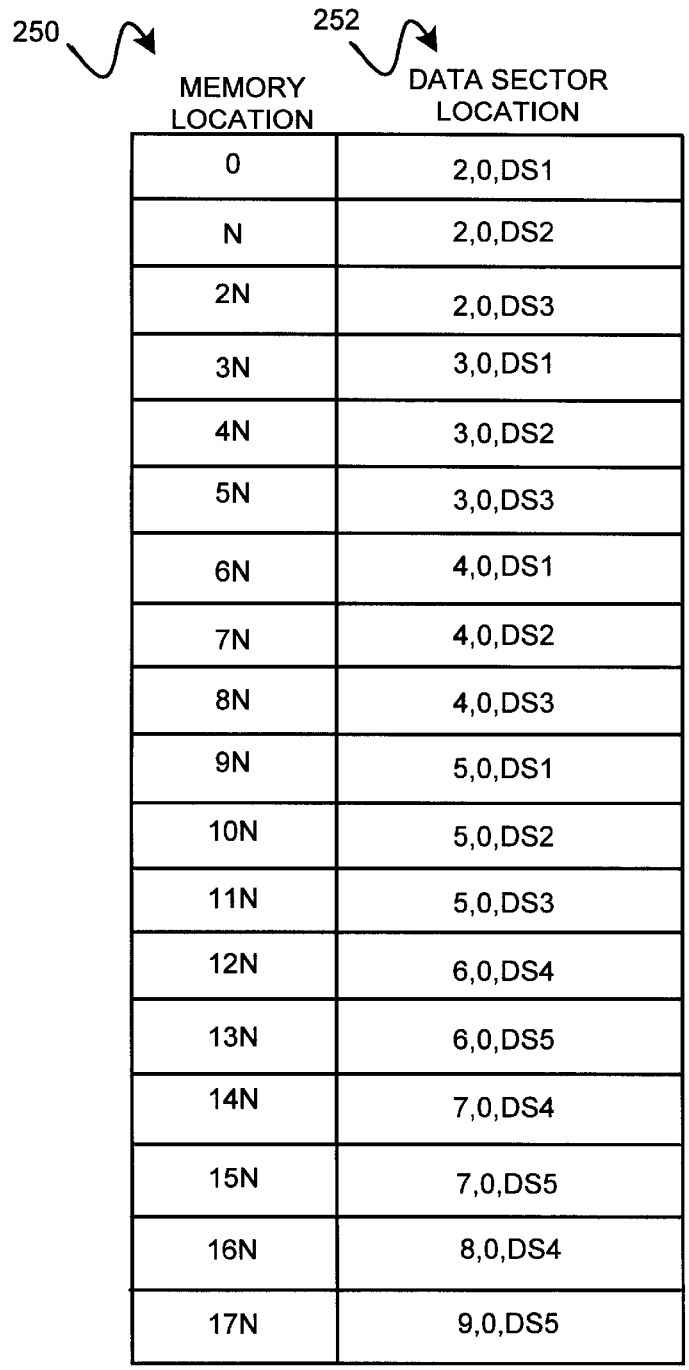
FIG. 8 is a representative defect management table in accordance with an embodiment of the present invention.

FIG. 8 represent a defect management table generated from the defect discovery table used in formatting the disk surface 52 and used for subsequent reading and writing on the disk surface. Column 250 represents the memory location where information is stored for each defective or marginal data sector (physical sector). Column 252 represents the data sector location (physical sector address) stored in the table to record the location of each listed data sector. In one embodiment, the information for each identified data sector stored at each memory location includes the physical sector address of the data sector (i.e., cylinder number, head number, data sector number). Suitably, no differentiation is made in the defect management table between the data sectors associated with the defective data sites D1, D2 and the data sectors associated with the marginal data sites. The data sectors identified in the defect management table are not available for use by the disk drive during user operation.

In the exemplary embodiment shown, the data sector located on cylinder 2, head 0, data sector DS1 is stored at memory location 0; the data sector located at cylinder 2, head 0, data sector DS2 is stored at memory location N (where N is the length in memory locations of an entry); the data sector located at cylinder 2, head 0, data sector DS3 is stored at memory location 2N. Similarly, the remaining data sector locations are stored at memory locations 3N-17N.

By aggressively identifying defective data sites using the fly-height defect discovery process in accordance with an embodiment of the present invention, the probability of unrecoverable errors reported due to transducer head fly-height variations and/or grown defects can be reduced. Further, by using less aggressive padding of defective data sites identified using other defect discovery processes, disk drive capacity can be optimized. Further, the fly-height defect discovery process can be used during manufacturing and user operation of the disk drive.

In one embodiment, the fly-height defect discovery process preferably utilizes one or more fields in the servo patterns written to the disk surface 52. In one preferred embodiment, one of the servo sector fields which comprises a periodic data pattern written on the disk surface is used for fly-height detection during defect discovery. Further, a fly-height defect discovery process and other non-fly height defect discovery processes may be performed to located defective sites on disk surface 52. In particular, a non-fly height defect discovery process can be used which is similar to that previously described herein where a known data pattern is written to the disk surface 52 within the data segments between servo sectors. Subsequently, the written data pattern can be read and compared to the known data pattern written to the disk surface 52. As the transducer head 64 flies over the servo sectors contained within the servo wedges, the fly-height defect discovery process can monitor whether the transducer head 64 is flying within the fly-height specification by utilizing selected fields within the servo patterns.

Figure 9:
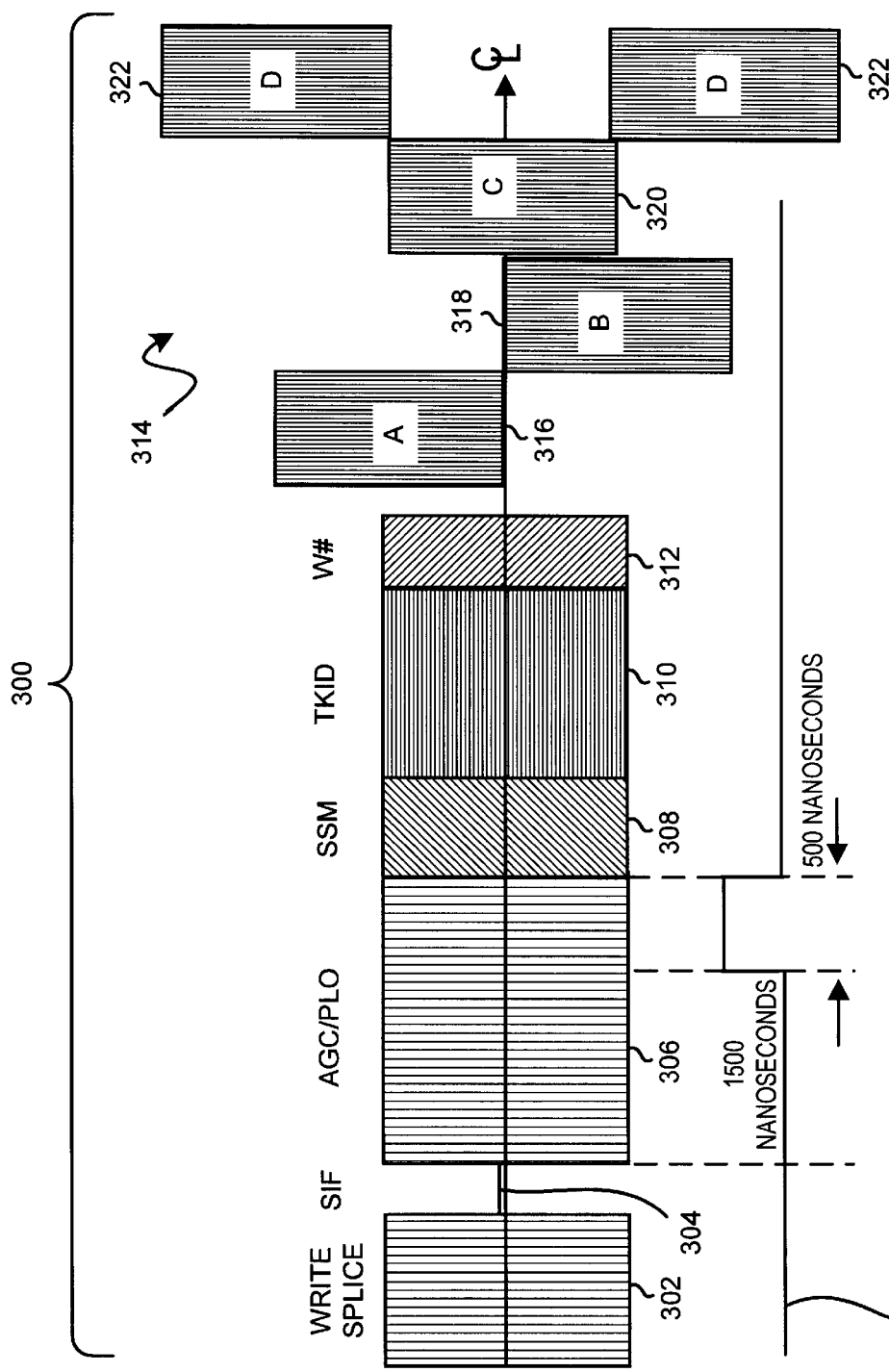
FIG. 9 shows components of a servo segment including a periodic reference segment used in a fly-height defect discovery procedure in accordance with an embodiment of the present invention.

FIG. 9 illustrates one exemplary embodiment of a servo sector 300 having fields useable for the fly-height defect discovery process in accordance with an embodiment of the present invention. The various fields of servo sector 300 are not drawn to scale. Servo sector 300 comprises a sequence of fields having various functions utilized by the servo system during operation of the disk drive.

Servo sector 300 includes a write splice or set-up field 302, servo initialization field (SIF) field 304, an adjustable gain control/phase lock oscillator (AGC/PLO) field 306, a servo sync mark (SSM) field 308, a track identification field (TKID) 310, a wedge number (W#) field 312 and servo burst 314. Right splice or set-up field 302 provides a buffer zone following a proceeding user data segment or sector, which is written to prevent an erasure erroneously detected as a servo initialization field. The SIF 304 provides a uniquely modulated segment that allows for detection of a servo segment. Typically, SIF 304 is created by a DC erase of the segment. The SIF field 304 provides a pattern with which the disk drive uses in its synchronous detection efforts when trying to lock onto the servo data.

The AGC/PLO field 306 provides a stable reference to set the gain of the channel and "train" a phase lock oscillator to lock on the servo channel frequency. Suitably, the AGC/PLO field 306 is a periodic reference segment, which can be used for generating a reference signal and providing fly-height varying components utilized by write condition detector 124 for characterizing the fly-height of transducer head 64.

SSM field 308 provides a uniquely coded word that synchronizes decoding logic to byte or word timing boundaries. TKID field 310 provides a coded binary address of the associated track or cylinder. Conventionally, a gray code is employed to allow for reading track identification fields such as TKID filed 310 during seek operations.

W# field 312 identifies the sequence number of each servo sector in the sequence of servo sectors spaced circumferentially around each track or cylinder. Servo burst fields 314 are used by the servo system to determine the position of transducer head 64 with respect to the tracked center during track following for operation of a read or write command. In the exemplary servo sector 300 shown, servo burst 314 includes servo burst A (316), servo burst B (318), servo burst C (320) and servo burst D (322). In one alternative embodiment of the present invention, one or more of servo burst A–D can provide a periodic reference segment utilized by fly-height detection system 120.

The following paragraphs detail one exemplary process of using a fly-height defect discovery process in accordance with an embodiment of the invention.

During a write operation, disk controller 80 asserts write gate signal WG1 to enable writing of data on disk surface 52. Servo controller 98 receives write gate signal WG1 and provides logic to conditionally assert a write gate signal WG2 to channel 68 and preamplifier 42. The conditional logic in servo controller 98 permits servo processor 96 to disable writing if, for example, an out-of-range head position is detected when processing a servo sector. During the fly-height defect discovery process in manufacturing, servo processor 96 and servo controller 98 operate to provide a warning signal and identify a defective data site if transducer 64 deviates outside its fly-height specification, such as above high-fly threshold 154.

During the read operation, servo controller 98 asserts servo gate signal SG and transducer head 64 generates read signal 92 while reading a periodic reference segment in a servo sector (for example AGC/PLO 306 in servo sector 300). Preamplifier 42 receives read signal 65 and generates read signal 92. AGC 122 receives read signal 92 and generates read signal 94. AGC 122 operates by biasing an AGC amplifier as known to those skilled in the art. AGC 122 is an amplifier/filter circuit that is used to control the shape, amplitude, and form of the pulses of read signal 92 by varying a low-pass cut-off frequency and high frequency boost associated with a AGC 122. AGC 122 provides variable gain to hold read signal 94 to a predetermined voltage level.

In one embodiment, the flying height of transducer head 64 can be characterized by the pulse width (PW50) of read signal 94, as detailed below. Suitably, the PW50 is characterized by an area to peak (area:peak) ratio of read signal 94. Alternatively, the PW50 can be characterized by other fly-height varying components of read signal 94. For example, in alternative embodiment, the PW50 can be characterized by fundamental and higher harmonic frequency components of read signal 94.

As transducer head 64 deviates above the nominal flying height 152, the pulse width widens, the area increases, and the peak of read signal 94 remains constant due to AGC 122 maintaining a substantially constant amplitude. As transducer head 64 deviates below the nominal flying height 152, the pulse width narrows, the area decreases, and the peak of read signal 94 remains constant due to AGC 122 maintaining a substantially constant amplitude. In summary, as transducer head 64 flies higher the area to peak ratio increases. As transducer head 64 flies lower, the area to peak ratio decreases.

In one embodiment, a high-fly threshold value is defined by a high-fly area to peak threshold ratio that is approximately 1.4 times nominal area to peak ratio, wherein the nominal area to peak ratio is an area to peak ratio for read signal 94 generated by transducer head 64 flying at a nominal flying height. A low-fly threshold value is defined by a low-fly area to peak threshold ratio that is approximately 0.5 times nominal area to peak ratio.

Suitably, the high-fly threshold value can be factored into an area component of read signal 94 to generate a scaled area component. The scaled area component is compared to a peak component of read signal 94 to determine if transducer head 64 has deviated from its operating flying height to an unsafe high-fly height. This corresponds to comparing the area to peak ratio of the read signal 94 to the high-fly area to peak threshold ratio. Alternatively, the area to peak ratio for read signal 94 is compared to the high-fly threshold value to determine if transducer head 64 has deviated from its operating fly-height to an unsafe flying height.

During the write operation, servo controller 98 asserts enable write condition detector (ENWCD) signal 130 and provides a high-fly threshold value to write condition detector 124, via serial communication line 132. Servo controller 98 receives write condition signal 128 from channel 68 and modifies write condition register 126 to reflect the status of write condition signal 128 at the conclusion of each servo sector.

Write condition detector 124 receives read signal 94 from AGC 122, and the high-fly threshold value via serial communication line 132 from servo controller 98. When ENWCD signal 130 is asserted, write condition detector 124 starts processing read signal 94 to detect the fly-height varying components of read signal 94. Suitably, fly-height detector 124 detects area and peak components of read signal 94. In response to the fly-height varying components and the high-fly threshold value, write condition detector 124 asserts the warning signal via write condition signal 128 when the flying height of transducer head 64 deviates from its operating fly-height (defined by a fly-height specification) to an unsafe fly-height. Write condition detector 124 provides write condition detection signal 128 to servo controller 98. In one embodiment, at the falling edge of SG signal, servo controller 98 monitors (polls) write condition detection signal 128 to determine whether to register a fly-height write condition in write condition register 126.

Write condition register 126 is read by interface processor 84 after the conclusion of servo processing by servo processor 96. Alternatively, servo controller 98 can generate a priority interrupt for interface processor 84.

If write condition register 126 indicates a high fly-height condition, interface processor 84 will mark (i.e., identify) the data site associated with the high fly-height condition as a defective data site and list an associated data sector (physical sector) in a defect management table using the process previously described herein.

Write Condition Detector

Figure 10:
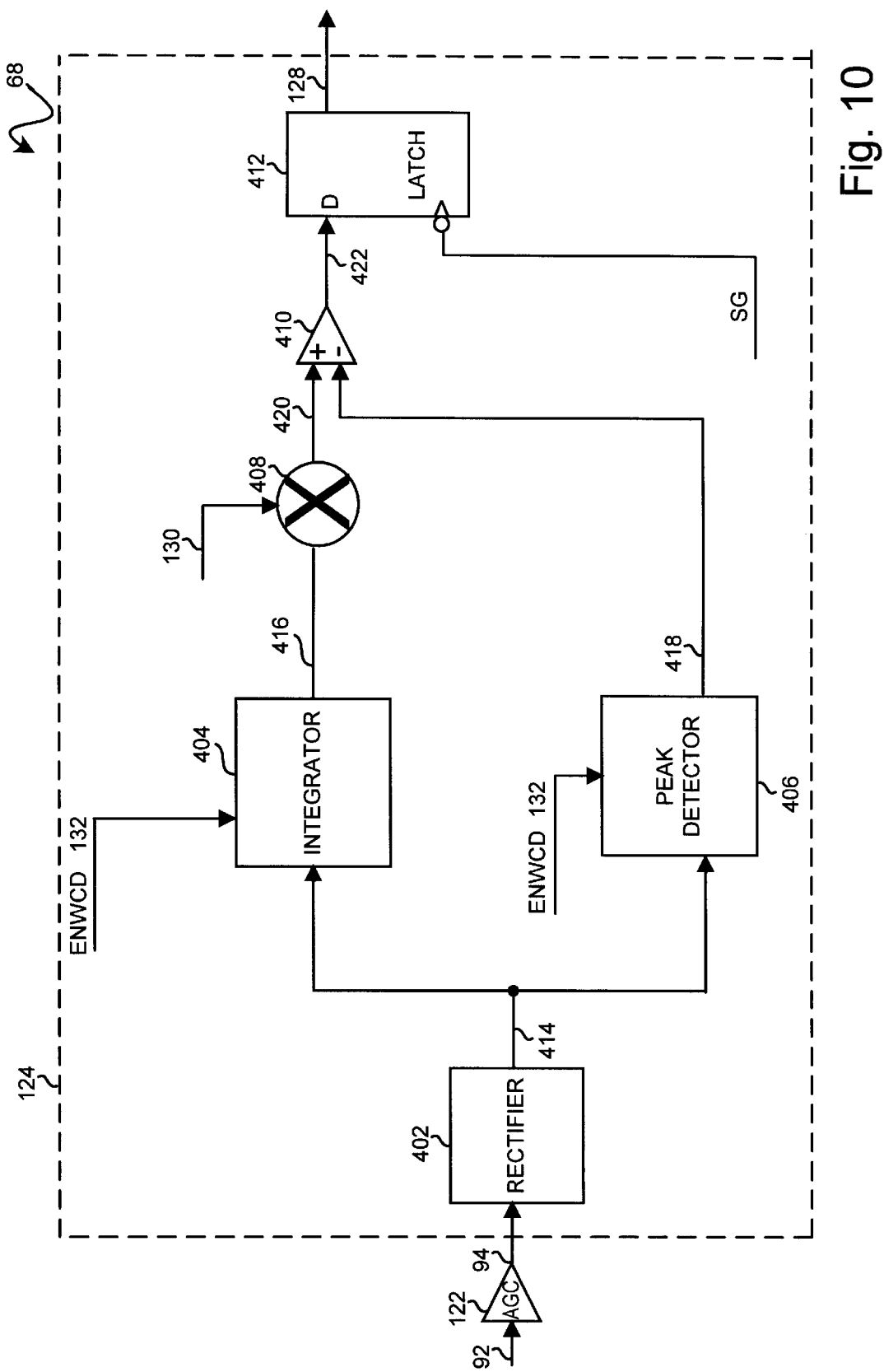
FIG. 10 is a block diagram illustrating one exemplary embodiment of a write condition detector suitable for use in a fly-height defect discovery procedure in accordance with an embodiment of the present invention.
Figure 11:
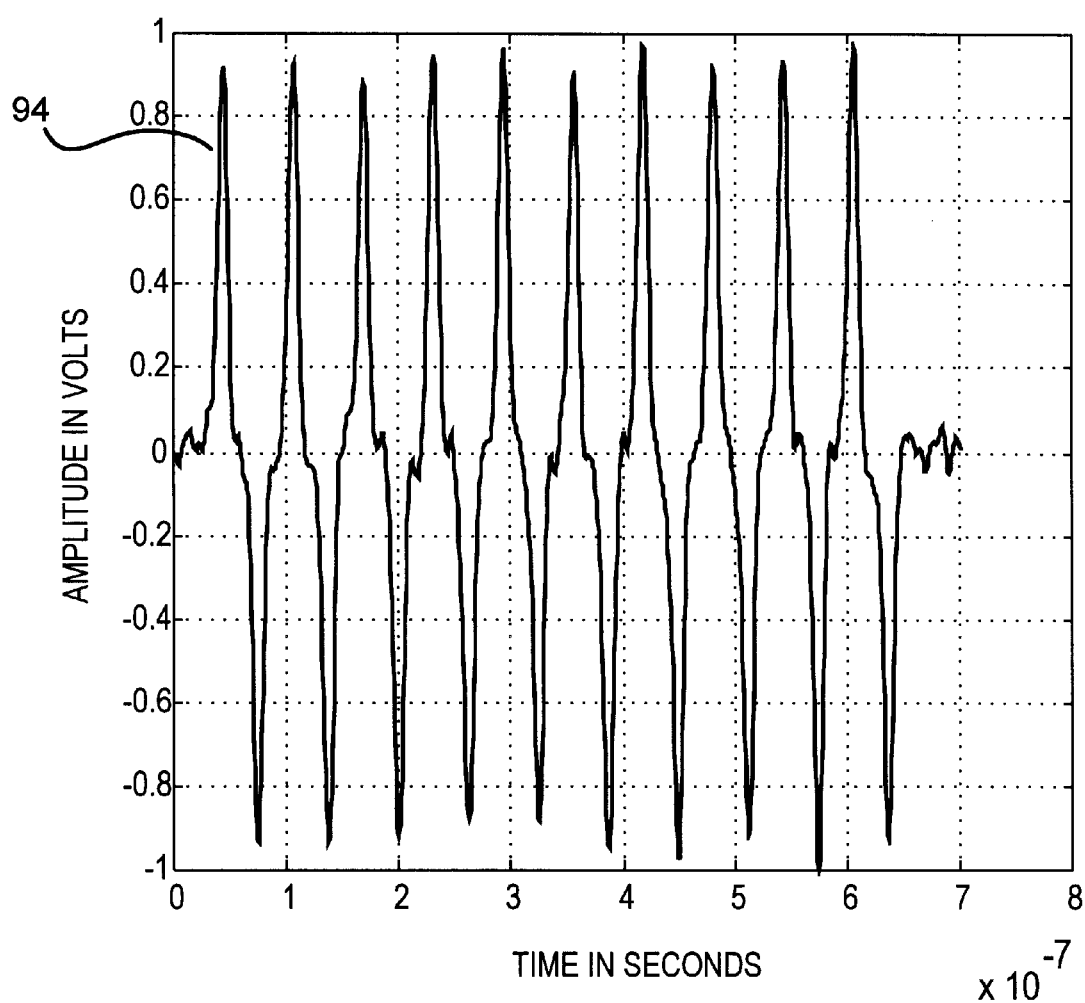
FIG. 11 is a graph illustrating a read signal provided to the write condition detector of FIG. 10.
Figure 12:
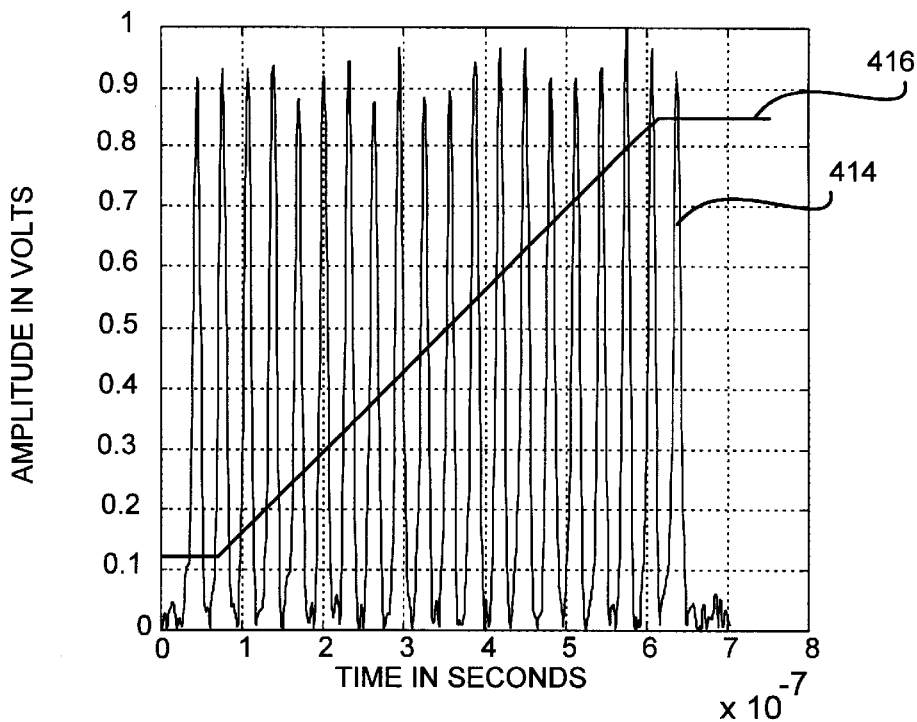
FIG. 12 is a graph illustrating a fly-height varying component of the read signal of FIG. 11.

In FIG. 10, one exemplary embodiment of write condition detector 124 is illustrated. Write condition detector 124 is suitable for determining "high-fly" conditions Write condition detector 124 can be used for identifying defective data sites during manufacturing which cause a transducer head to fly outside of a fly-height specification (i.e., range) and during operation of the disk drive for defect discovery, identification and listing of grown defects and inhibiting write operations. Write/ condition detector 124 includes a rectifier 402, an integrator 404, a peak detector 406, a multiplier (DAC) 408, a comparator 410, and a latch 412. In one embodiment, rectifier 402 is a full wave rectifier. In response to read signal 94 received from AGC 122, rectifier 402 provides a rectified read signal 414 to integrator 404 and peak detector 406. Referring also to FIG. 11, a graph is shown illustrating one exemplary embodiment of a wave form of read signal 94 from AGC 122 provided to rectifier 402. Referring also to FIG. 12, a graph is shown illustrating one exemplary embodiment of rectified read signal 414 from rectifier 402, having an approximate 0.0–1.0 volt peak-to-peak voltage variation.

In response to rectified read signal 414, integrator 404 operates to measure the area under the pulse of rectified read signal 414 for use in generating write condition signal 128. As AGC 122 maintains a substantially constant amplitude of read signal 94, the pulse width or PW50 of read signal 94 will be wider with a higher flying head 64. Correspondingly, the area under the pulse is greater with a higher flying transducer head 64.

Integrator 404 and peak detector 406 are enabled by the ENWCD signal 132 received from servo controller 98. Upon receipt of the ENWCD signal 132, write condition detector 124 begins monitoring the fly-height of transducer head 64. In one preferred embodiment, fly-height detector 124 begins monitoring the AGC/PLO field 306 signal during a final portion, which in one preferred embodiment is last 25% of the AGC/PLO field 306.

For example, in one embodiment the duration of the AGC/PLO field 306 is 2000 nanoseconds; as a result a first timer would wait 1500 nanoseconds before servo controller 98 asserts ENWCD signal 132. Integrator 404 begins to integrate rectified read signal 414 when II enabled by ENWCD signal 132. A second timer and servo controller 98 would then wait to the remaining 500 nanoseconds before servo controller 98 deasserts ENWCD signal 132.

While ENWCD signal 132 is asserted, integrator 404 integrates rectified read signal 414 and generates an area read signal 416. Peak detector 406 detects the peak of rectified read signal 414 and generates a peak read signal 418. Integrator 404 integrates rectified read signal 414 from 0.0 to 0.85 volts with a final integrated value or amplitude of 0.85 volts. Referring also to FIG. 12, a graph is shown illustrating one exemplary embodiment of a waveform of area read signal 416.

Figure 13:
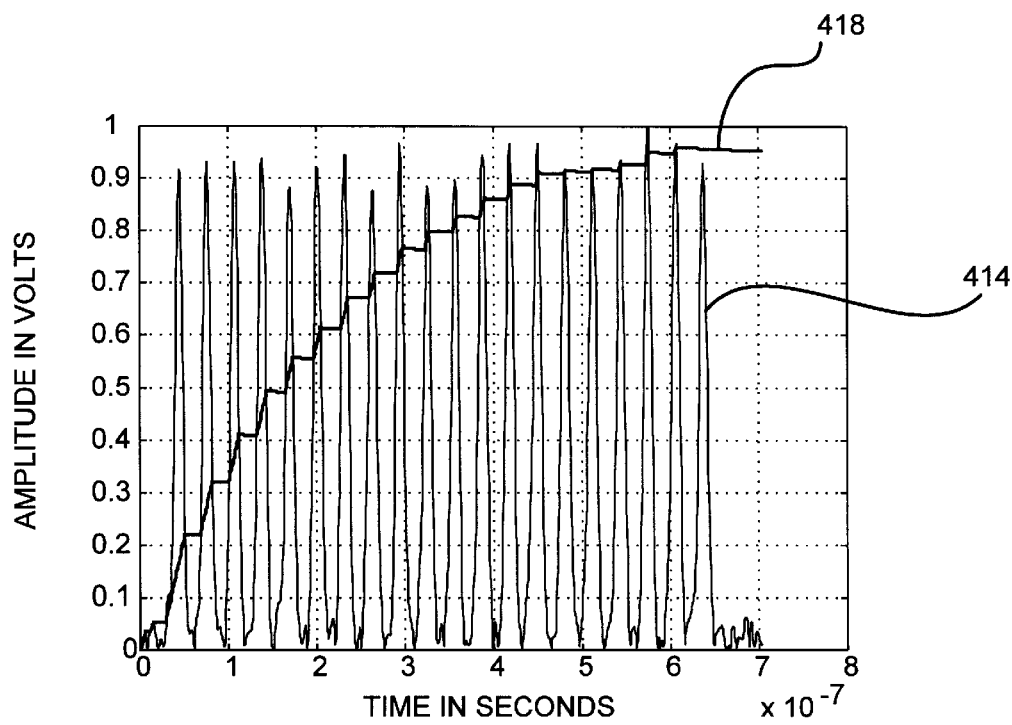
FIG. 13 is a graph illustrating another fly-height varying component of the read signal of FIG. 11.

Peak read signal 418 is a slow-moving DC signal representing the peak amplitude of rectified read signal 414. Peak detector 406 can be a conventional differential peak detector which provides peak read signal 418. Alternatively, peak detector 406 can be a conventional envelope detector. Referring also to FIG. 13, a graph is shown illustrating one exemplary embodiment of peak read signal 418 according to this alternate embodiment.

Multiplying DAC 408 receives area read signal 416 from integrator 404 and a digital high-fly threshold value via serial communication line 132 from servo controller 98. The digital high-fly threshold value is a programmable or predefined threshold coefficient that is computed by servo processor 96 and provided to servo controller 98. Multiplying DAC 408 combines area read signal 416 and the high-fly threshold value to generate a combined area/high-fly threshold signal 420 (scaled area read signal 420). Read signal 420 is provided to analog comparator 410 and compared to peak read signal 418. If combined area/high-fly threshold signal 420 has a voltage level that exceeds the voltage level for peak read signal 418, then the output of comparator 410 is high (i.e., true), indicating that transducer head 64 has deviated from it operating fly-height to a fly-height which is outside of the fly-height specification (i.e., an unsafe flying height).

Write condition detector 124 may be realized separately in a stand alone integrated circuit or may be realized as a component of an integrated circuit, such as a component of channel 68. Implementing write/defect condition detector 124 in hardware can reduce the firmware processing load on servo processor 98 and interface processor 84.

Figure 14:
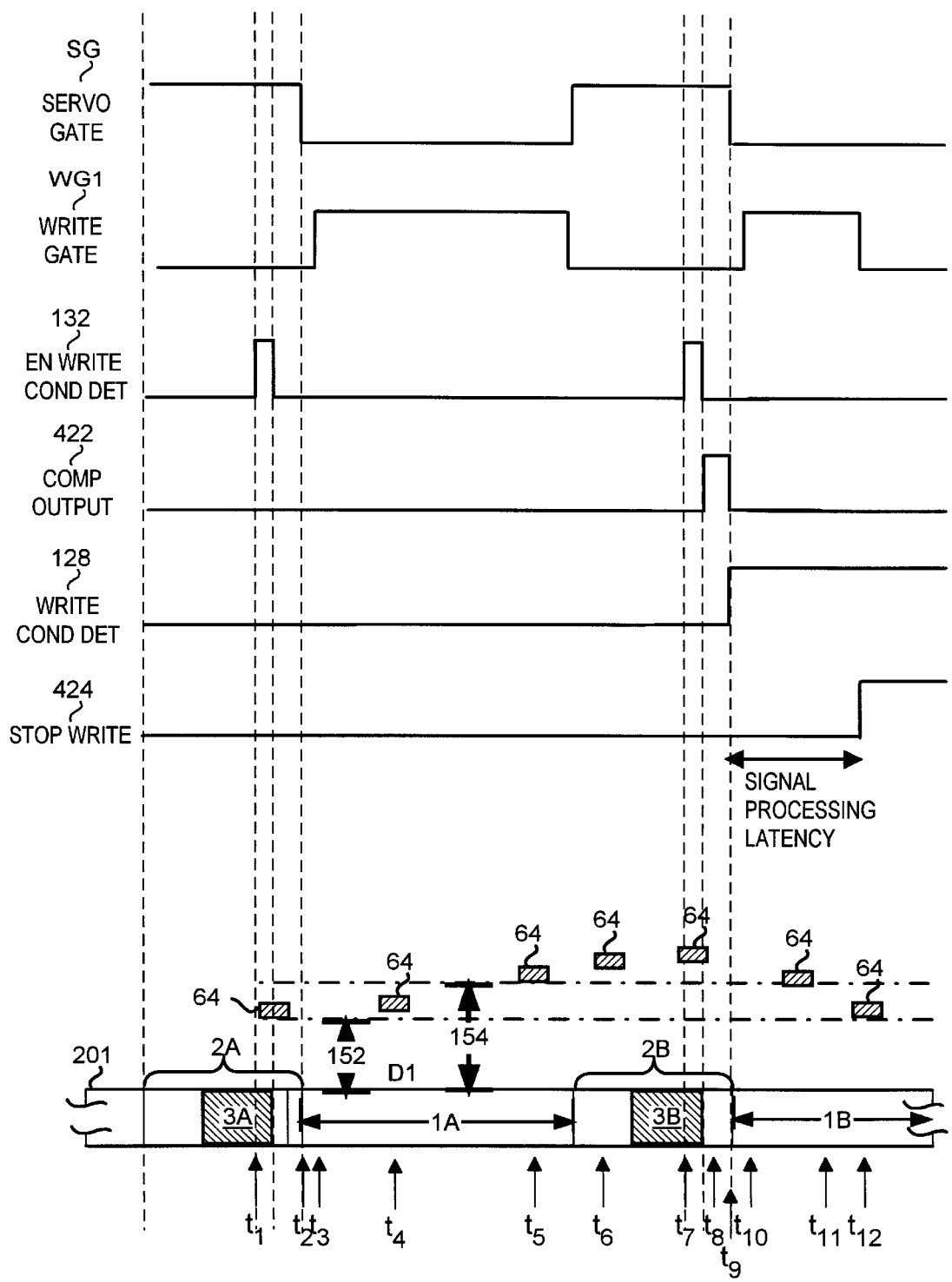
FIG. 14 is a diagram illustrating the flight path of a transducer head flying over a defective data site on a disk surface during a fly-height defect discovery procedure illustrating the relative timing relationship between the detection of an unsafe flying height and a warning signal generated using the write condition detector of FIG. 10.

FIG. 14 shows the timing relationship between the detection of a high-fly condition due to a defective data site and various timing signals. In particular, transducer head 64 is illustrated in various stages of an example flight path over the defective data site D1 on disk surface 52, wherein write condition signal 128 is asserted in response to transducer head 64 flying above high-fly threshold 154. The example flight path begins over a first periodic reference segment 300 which is suitably the AGC/PLO field 306 represented by 3A and 3B. Transducer head 64 is shown initially flying at nominal fly-height 152.

Write condition detector 124 begins processing read signal 94 at time $T_1$ when enable write detection (ENWCD) signal 132 is asserted. During the reading of servo sector 2A and including time $T_1$ until time $T_2$, servo gate signal SG is high. At the falling edge of servo gate SG, comparator output 422 is sampled in write condition detector 124. Because transducer head 64 is flying at a "safe" height within a specified fly-height, comparator output 422 is low and therefore the latched signal, write/defect condition signal 128, remains low indicating that transducer head 64 is flying within the fly-height specification and there are no detectable defective data sites which affect transducer head fly-height. At $T_3$, write gate signal WG1 is asserted and the writing of user data commences at user data segment 1A for a non-fly height defect discovery process. At $T_4$, a disk defect (e.g., a defect D1) causes the fly-height of transducer head 64 to increase. At $T_5$, transducer head 64 flies above high-fly threshold 154 set at 150% of the nominal fly-height computed for track 201. At $T_6$, transducer head 64 flies above second periodic reference segment 3B which is AGC/PLO field 303 of servo sector 2B. At $T_7$, transducer head 64 is flying high, above the high-fly threshold 154. Write condition detector 122 begins to process read signal 94 at $T_7$, when ENWCD signal 132 is again asserted.

At $T_8$, comparator output 422 is high if scaled area/high-fly threshold signal 420 being monitored in write condition detector 122 has exceeded peak read signal 418.

At $T_9$, the comparator output signal 422 is latched by the falling edge of servo gate signal SG, causing write condition signal 128 to be asserted. Servo controller 98 registers write condition signal 128 in write condition register 126 indicating the transducer head 64 is flying outside of the fly-height specification (i.e., a high-fly condition). At $T_{10}$, disk controller 80 once again asserts write gate signal WG1 to continue writing user data. At the conclusion of processing servo sector 2B servo processor 96 recognizes that the write condition detect byte in register 126 is true. Servo processor 96 causes interface processor 84 to be interrupted by servo controller 98 to indicate that servo sector processing is complete at $T_{11}$. At $T_{12}$, interface processor 84 recognizes that transducer head 64 was flying high and sends a stop write signal, indicated by stop write signal 424 in FIG. 14, to disk controller 28 causing write gate signal WG1 to be deasserted and suspending the write operation until recovery procedures can be implemented. The delay between the assertion of fly-height condition signal 128 and the responsive interface processor 84 to provide the stop write signal 424 is shown by the arrow labeled "signal processing latency."

Transducer head 64 may return to an operating fly-height and pass over the next periodic reference segment at an operating fly-height. Alternatively, transducer head 64 may continue to fly above a high-fly threshold. In either case, the read operation for user data segment 1A may have to be either verified or verified and rewritten and the write operation for user data segment 1B may have to be retried.

Computing Zone Coefficients during Manufacturing of Disk Drive 20

The disclosure of commonly owned co-pending Patent Application Ser. No. 08/918,025, filed Aug. 25, 1997, entitled "Disk Drive with Separately Determined Servo and Data Track Pitch" is incorporated herein by reference (the "incorporated application"). The incorporated application discloses a servo track and data track structure employing a ratio of 1.5:1 between a data track pitch and a servo track pitch. This servo track and data track structure effects odd tracks more than even tracks because odd data tracks straddle two servo tracks. Due to this servo track and data track structure, the odds tracks have a phase misalignment that results in increasing the PW50 for the odd tracks.

Suitably, recording surface 52 has the servo track and data track structure disclosed in the incorporated application. Because of the phase misalignment for odd tracks, zone coefficients are computed separately for odd and even tracks. Alternatively, recording surface 52 can have a servo track and data track structure that does not result in the phase misalignment, and which permits having the same zone coefficients for odd and even tracks.

The zone coefficients are determined during an intelligent burn in (IBI) process that occurs during manufacturing of disk drive 30. The zone coefficients are determined separately for odd and even tracks, and for each head, zone combination. Alternatively, zone coefficients are the same for odd and event tracks. The determination of zone coefficients must of necessity be performed quickly due to time and cost constraints. A number of zone test tracks are selected.

Referring also to FIG. 3, three zones (ZONE 1, ZONE 2, ZONE 3) have example test tracks in each zone. Zone 1, with test tracks 200 and 202, will be used to illustrate the computation of zone coefficients during the manufacturing of disk drive 30. A predetermined number of odd and even tracks are selected near the test tracks 200 and 202. The threshold calculation is done for the odd tracks separately from the even tracks.

At each selected test track, a threshold measurement procedure is followed. In the procedure, a seek is performed to the track. While track following, the value of a programmable threshold is set to a high value by servo processor 96. Write condition signal 128 is monitored (polled) by servo processor 96. A high-flying height threshold is reduced by a predetermined amount until write/defect condition signal 128 indicates a high-fly write condition. The value will, for most cases, not represent an actual high-fly condition but will represent the nominal fly height of head 64.

To reduce the effect of error due to noise and the potential for a real high-fly condition, the measurement may be taken multiple times and at nearby tracks and averaged to result in an averaged value for the test track. The measurements may also be taken at certain track intervals across a zone.

Multiple tests at various track locations are taken for each zone. These results are then fit to a linear equation, with a least squares fit, to obtain the zone coefficients. Higher order fits may also be used. The zone coefficients are then stored for each zone and head combination for the odd and the even tracks. Suitably, the zone coefficients are stored on recording surface 52 and provided to servo processor 96 during power up of disk drive 30.

Testing only a few tracks in a zone speeds up the intelligent burn in process during the manufacturing of disk drive 30, and storing zone coefficients saves memory space.

In an alternate embodiment, the intelligent burn in process determines a nominal fly-height for all tracks on disk 52. The high-fly threshold is then stored for each head and track combination, avoiding the need for estimation and subsequent processing. Alternatively, zone coefficients may be used to compute high-fly thresholds for each track during the intelligent burn in and stored for each head and track combination.

Figure 15:
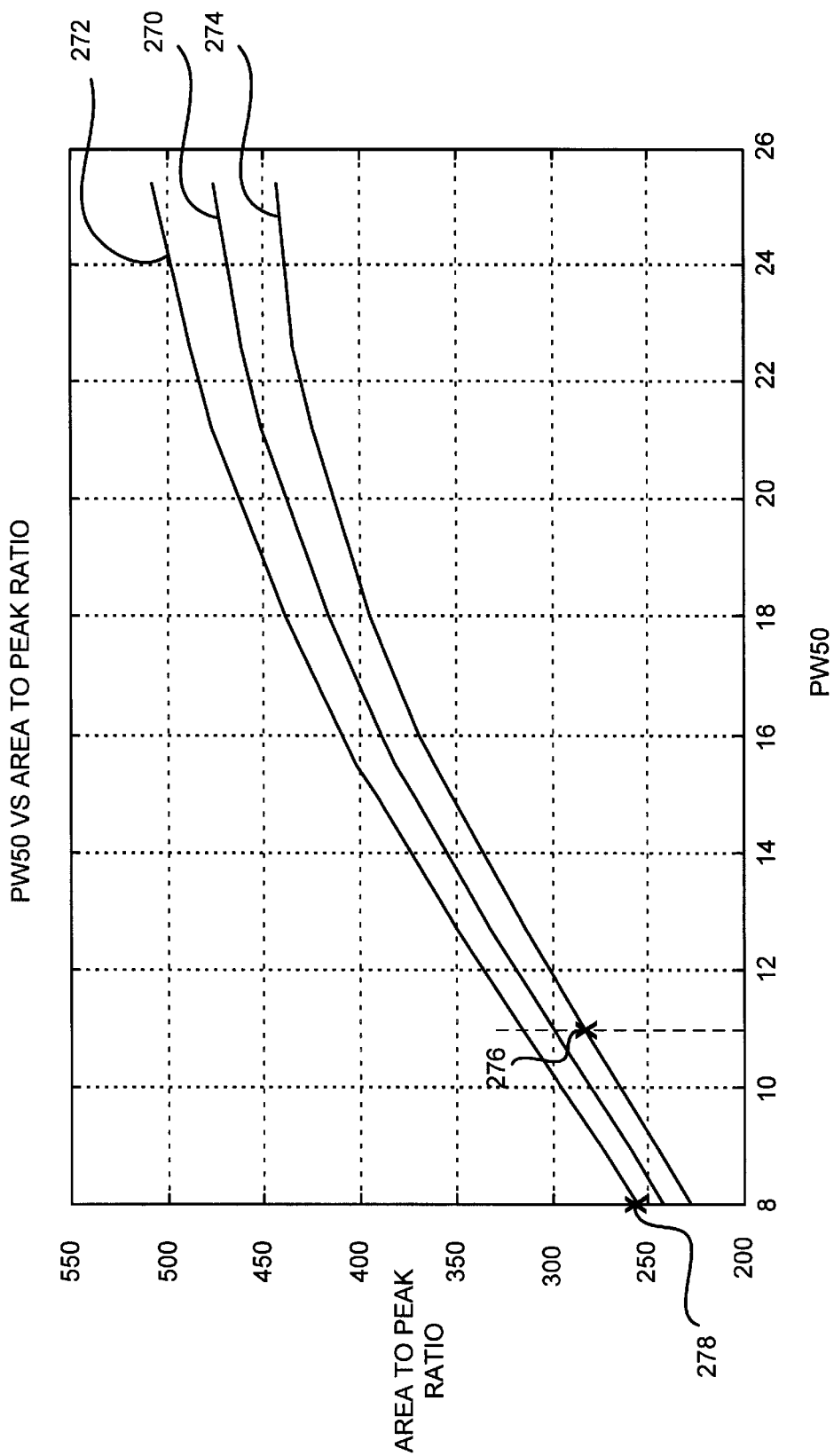
FIG. 15 is a graph illustrating one exemplary embodiment of the average to peak ratio as a function of PW50 from a simulation of the disk drive 30 of FIG. 1.

The read signal used to represent flying height can be characterized by its PW50 value. The flying height can then be represented by a PW50 value which varies as the head is moved from the ID to the OD of the disk. PW50 is a well known means of characterizing the pulse response from isolated transitions in digital signal recordings. In disk drives, the PW50 is typically expressed in nanoseconds, abbreviated as "ns". Although PW50 is measurable in a design environment, it is not practically measured in an operating disk drive. The average area to peak ratio of the read signal is more practically measured and can serve as a PW50 indicator by obtaining a plot of the relationship between a given PW50 and its corresponding area to peak ratio. FIG. 15 provides such a plot for an exemplary disk drive from simulation using a $4^{th}$ order pulse model and a signal to noise ratio of 24 dB. Curve 270 represents the nominal case for area to peak ratio in arbitrary count values (Y-axis) vs. PW50 in ns (X-axis). Curve 272 provides a +3σ case while curve 274 provides the −3σ case. The plot in FIG. 15 then allows for calculating threshold values when flying height data is provided as follows.

Table 1 below provides a definition, in the exemplary disk drive, of PW50 values in ns associated with nominal (even) tracks and corresponding high-fly (HF) conditions including variations owing to location (ID, OD), variance due to the aforementioned odd track servo sector arrangement (1σ variance), and worst case for nominal flying height (+3σ odd track variance). Also included is a high fly value which represents a 100% increase in flying height from the worst case nominal, calculated as a factor of √2.

TABLE 1

| Location | Nominal Even | Nominal Even HF | Nominal Odd | Nominal Odd HF | Worst Case Nominal | High Fly ← * √2 |
|---|---|---|---|---|---|---|
| OD | 8 | 11 | 9 | 12.7 | 11 | 15.5 |
| ID | 15 | 21.2 | 16 | 22.6 | 18 | 25.6 |

Now with the graph of FIG. 15 and Table 1, it is possible to establish high-fly threshold values across the disk radius and determine the resolution required for the DAC 408 of FIG. 5. For example Table 1 shows that an even track at the disk OD has an average PW50 of 8 ns. Allowing for statistical variation, we would apply the corresponding +3σ (highest apparent nominal) value from curve 272 on the graph yielding an area to peak ratio value of 256, indicated at 276. The high-fly PW50 for this point is nominally 11 ns from Table 1. The area to peak ratio for the high-fly at this point is determined by applying the corresponding −3σ value (lowest apparent high-fly) from curve 274 yielding a value of 283, indicated at 278. The net difference between the two ratios is 10.5% (283/256). Suitably we would set a threshold point which is halfway between the two, therefore a resolution of half the difference (5.25%) is required. This would be satisfied by a resolution of 5 bits (32 steps=3.1% per step.).

According to the above defined process, Table 2 shows the expected difference expressed in percent between nominal and high-fly area to peak ratios at disk ID and OD from the graph of FIG. 15 and PW50 values of Table 1.

TABLE 2

| Location | % Even Track | % Odd Track | % Odd 3σ |
|---|---|---|---|
| OD | 8 | 11 | 9 |
| ID | 15 | 21.2 | 16 |

From Table 2 we can determine that a marginal condition would exist in detecting the difference between a nominal and high flying head at the worst case point (% Odd 3σ column) at the ID because only 1% of difference would be shown. The separation between the high-fly and nominal area to peak ratios will however improve with higher signal to noise ration. Therefore the system implementation would be specified to have a higher signal nose ratio, for example 28 dB.

The following is an example of a method for calibrating a high-fly threshold value for ZONE 1 on recording surface 52 during manufacturing of disk drive 30. This method is suitable for disk drive 30 employing write condition detector 124 of FIG. 10. The high-fly threshold value is calibrated so that head 64 is considered to be flying at an operating flying height until it deviates 40% above a nominal flying height to an unsafe high flying height. This calibration method assumes the following parameters for head 64 flying at the nominal flying height over test track 200 in ZONE 1:

a. read signal 94 has a PW50 equal to 8 ns;
b. ENWCD signal 130 is asserted for a period of 500 ns and;
   i. integrator 404 receives rectified read signal 414 and generates area read signal 416 representing a value equal to 0.6 v; and
   ii. peak detector 406 receives rectified read signal 414 and generates peak read signal 418 representing a value equal to 0.8 $v_{peak}$.

Table 3 shows the PW50 and the area to peak ratio for nominal and unsafe flying heights of head 64.

TABLE 3

PARAMETERS FOR NOMINAL AND UNSAFE FLYING HEIGHTS

| Read Signal 18A | Nominal Flying Height | Unsafe Flying Height (40% deviation from nominal flying heights) | |
|---|---|---|---|
| | | Unsafe High-Flying Height (+40% deviation) | Unsafe Low-Flying Height (−40% deviation) |
| PW50 | 8 ns | 11.2 ns | 4.8 ns |
| Area | .6 v | .84 v | .36 |
| Peak | .8 v | .8 v | .8 |
| Area:Peak Ratio | .75 | 1.05 | .45 |

Column 1 shows components of read signal 94 that can be used for characterizing the flying-height of head 64. Column 2 shows values for the components of read signal 94 when head 64 is flying at the nominal flying height. Column 3 shows values for the components of read signal 94 when head 64 is flying at an unsafe high-fly height and an unsafe low flying height. The values for the unsafe high flying height define high-fly threshold values. The values for the unsafe low-flying height define low-fly threshold values.

The calibration method assumes that head 64 is flying over track 200, in ZONE 1, at an operating flying height. The operating flying height varies as head 64 is moved from the ID to the OD of disk 52. The high-fly threshold value for ZONE 1 is calibrated in the following manner:

a. ENWCD signal 130 is asserted for a period of 700 ns, which is 40% longer than the period of 500 ns for head 64 flying at the nominal flying height;
   i. integrator 404 receives read signal 414 and generates area read signal 416 representing a value equal to 0.84 v, which is 40% higher than the value of 0.6 v for head 64 flying at the nominal flying height;
   ii. peak detector 406 receives read signal 414 and generates peak read signal 418 representing a value equal to 0.8 $v_{peak}$, which is the same as the value of 0.8 v for head 64 flying at the nominal flying height due to AGC 122 maintaining a substantially constant amplitude;
c. Multiplying DAC 408 combines area read signal 416 and a digital high-fly threshold value to generate a scaled area read signal 420 (combined area reference/high-fly threshold 420); and
d. The digital high-fly threshold value is calibrated so that the voltage level for the scaled area read signal 420 is below the voltage level for peak read signal 418.

The step of increasing the period for asserting ENWCD signal 130 by 40% (from 500 ns to 700 ns), while head 30 is flying at an operating flying height, increases areas read signal 416 by 40% to simulate area read signal 416 for head 64 flying at an unsafe high-flying height. However, because head 64 is assumed to be flying at an operating flying height, the digital high-fly threshold value is adjusted so that scaled area read signal 420 is below the voltage level for peak read signal 418.

Computing High-Fly and Low-Fly Thresholds

During seek operations to a target track, the high-fly threshold is computed based on zone coefficients determined during manufacturing of disk drive 30. The zone coefficients can be stored on recording surface 52 and provided to servo processor 96 during power up of disk drive 30. Suitably, a threshold register, such as a digital value register in DAC 408, has a resolution of five binary bits.

When the host computer instructs disk drive 30 to perform a write operation, the seek operation is initiated by interface processor 84. During the seek operation, servo processor 96 receives the target track number from interface processor 84. Servo processor 96 provides commands to servo controller 98 to drive actuator/suspension assembly 40 to move head 64 over the target track. For a write operation, the seek operation positions head 64 over a track with an available user data segment. Servo information is read from disk 52 to determine the position of head 64 in relation to disk 52. Also, threshold information needed to initialize write/defect condition detector 124 is computed by servo processor 96 based on the target track number.

Servo processor 96 determines to what zone the destination track belongs. Servo processor 96 then fetches zone coefficients for the high-fly threshold calculation for the zone of the destination track of the seek. The zone coefficients are a slop for the zone and an intercept for the zone as a linear function of track number:

High-fly threshold=Slope for the Zone * Track Number+Intercept for the Zone

Servo processor 96 computes the high-fly threshold based on the target track number, head number and zone coefficients. Servo processor 96 then sends the high-fly threshold to servo controller 98 over the servo bus. Servo controller 98 sends the high-fly threshold for the current track and head to write/defect condition detector 124 through serial communications line 132.

Write condition detector 124 receives and processes read signal 94 into the fly-height varying components, receives a high-fly (or low-fly) threshold value, and generates write condition signal 128 in response to the fly-height varying components and the high-fly (or low-fly) threshold value. Write condition detector 124 asserts write condition signal 128 when head 10 deviates from an operating flying height to an unsafe high-flying height. Alternatively, write condition detector asserts write condition signal 128 when head 64 deviates from the operating flying height to an unsafe low-flying height.

Write condition detector 124 is enabled by servo controller 98 to detect the fly height varying components while head 64 is reading the periodic reference segment. The periodic reference segment includes a periodic signal that is written during manufacturing of disk drive 30 on tracks of disk 52. For example, the periodic reference segment can be AGC/PLO field 306 or one of servo burst fields 316–322.

Write condition detector 124 can include hardware and/or firmware components to generate and process the fly height varying components and the high-fly (or low-fly) threshold value. For example, servo controller 98 enables write condition detector 124 to detect fly height varying components from read signal 94. The fly height varying components of read signal 94 can be an area component and a peak component of read signal 94; or a fundamental frequency component and a higher harmonic frequency component of read signal 94.

For example, write condition detector 124 can include hardware components for generating and processing the fly height varying components and the high-fly threshold value, and asserting write condition signal 128 when head 64 has deviated from an operating flying height to an unsafe high-flying height. Alternatively, interface processor 84 (or servo processor 96) can compute the ratio of two components of read signal 94 to generate a fly-height representing signal. Also, interface processor 84 (or servo processor 96) can compare the fly-height representing signal to the high-fly threshold value and assert a write condition signal (such as signal 128) when head 64 is flying above the high-fly threshold value.

The flying height of head 64 can be monitored during disk drive write operations to determine if the flying height of head 64 has deviated from its operating flying height to an unsafe flying height. Monitoring the flying height of head 64 can improve the integrity of write operations and reduce read errors due to high-fly write conditions during the write operation. Also, monitoring the flying height of head 64 for low-fly write conditions can provide a warning for an impending head crash.

The fly-height defect discovery process can also be used for discovery grown defects during user operation of disk drive 30. During user operation of disk drive 30, write condition detector 124 suitably provides a warning signal, such as write condition signal 128, used to suspend (i.e., temporarily stop) a write operation in response to a defect causing the transducer head 64 to fly outside of the fly-height specification. Further, defective data sectors associated with the warning signal can be identified as grown defects and listed in a table in memory (termed G-list). Further, the grown defects discovered during the fly-height defect discovery process can be added to the defect management table so that they are no longer available for use by the disk drive 30 during the user operation.

Figure 16:
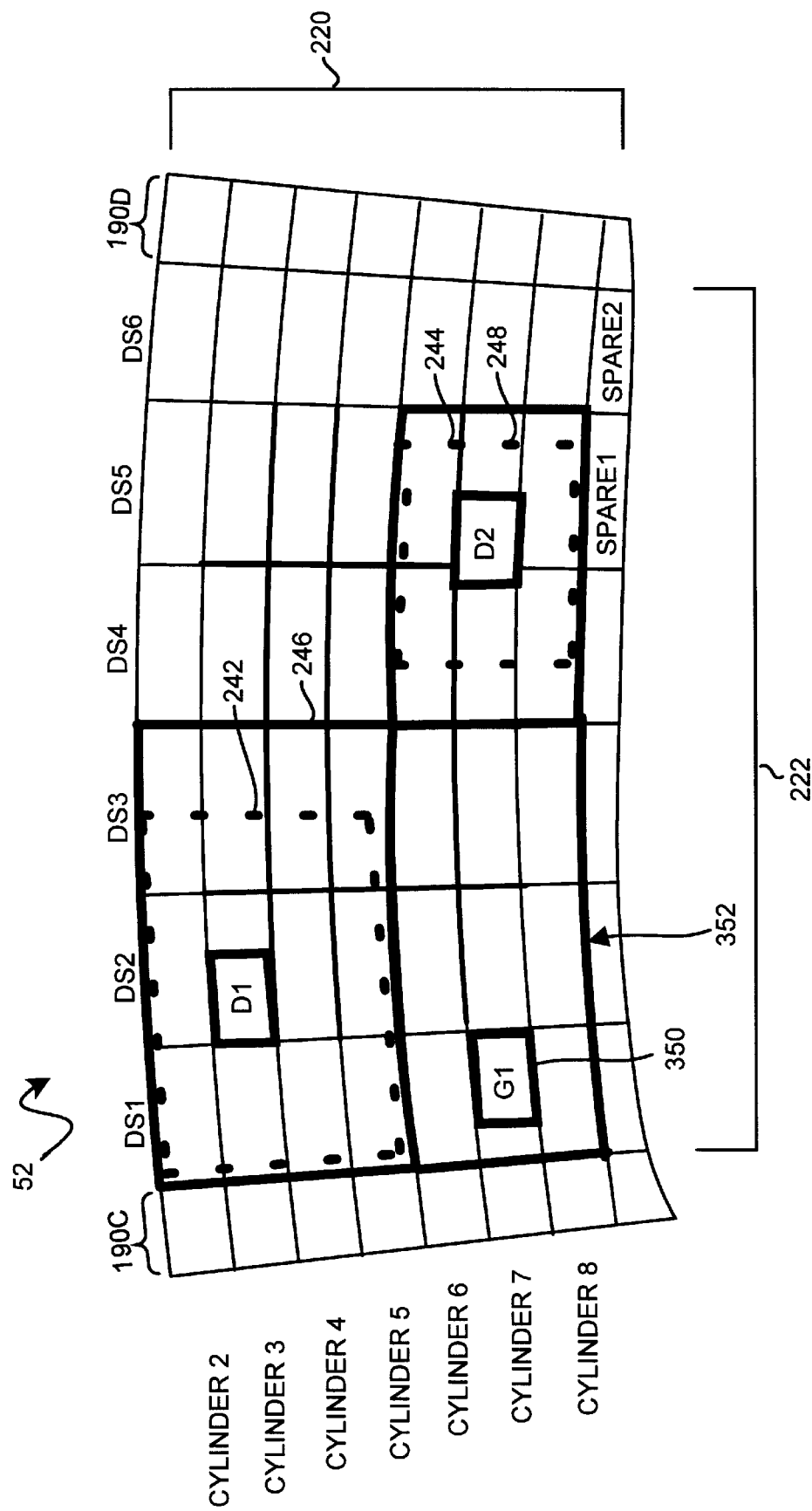
FIG. 16 is an enlarged partial plan view illustrating a grown defect identified using the fly-height defect discovery procedure in accordance with an embodiment of the present invention.

In FIG. 16, a portion of disk surface 52, partition 220 (see also FIG. 7) is illustrated. Grown defective data site G1 (indicated at 350) has been identified using the fly-height defect discovery process in accordance with an embodiment of the present invention, during user operation of the disk drive. Grown defective data site G1 is identified using the fly-height defect discovery process previously detailed herein for defect discovery during manufacturing. A padding procedure can be employed by marking out data sectors based on their proximity to the grown defect as also unusable for storing data. The data sector boundary of the padded or marginal data sectors is indicated at 352.

Figure 17:
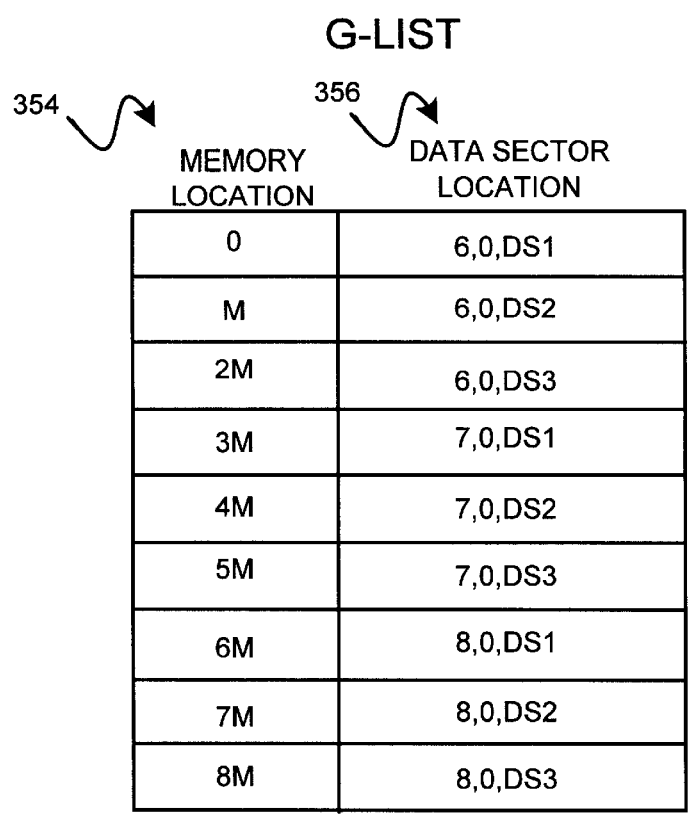
FIG. 17 is a representative grown defect table generated after discovery of a grown defect using the fly-height defect discovery procedure in accordance with an embodiment of the present invention.

In FIG. 17, a grown defect list or "G-list" is generated from the data sectors including the marginal data sectors and grown defect G1. As shown, column 354 indicates the relative memory location for each table entry, and column 356 represents the data sector location stored in the table to record the location of each listed data sector. In one embodiment, the information II for each identified data sector stored at each memory location includes the physical sector address of the data sector (i.e., cylinder number, head number, data sector number). Suitably, no differentiation is made in the G-list between the data sectors associated with the defective data sector including grown defect G1 and the data sectors associated with the padded marginal data sectors. The data sectors identified in the G-list are added to the defect management table (see FIG. 8) and are not available for use by the disk drive during user operation.

In the exemplary embodiment shown, the data sector located on cylinder 6, head zero, data sector DS1 is stored at memory location 0M; the data sector located at cylinder 6, head zero, data sector DS2 is stored at memory location M (where M is the length in memory locations of an entry); the data sector located at cylinder 6, head 0, data sector DS3 is stored at memory location 2M. Similarly, the remaining data sector locations are stored at memory locations 4M–8M. By aggressively identifying defective data sites due to grown defects during operation of disk drive 30 using the fly-height defect discovery process in accordance with an embodiment of the present invention, the probability of unrecoverable errors caused by the transducer head 64 flying outside of a fly-height specification are reduced. Once the grown defects are identified using the fly-height defect discovery process, they are listed in a table in memory (G-list) and added to the defect management table, such that they are no longer available for use by the disk drive during user operation.

Figure 18:
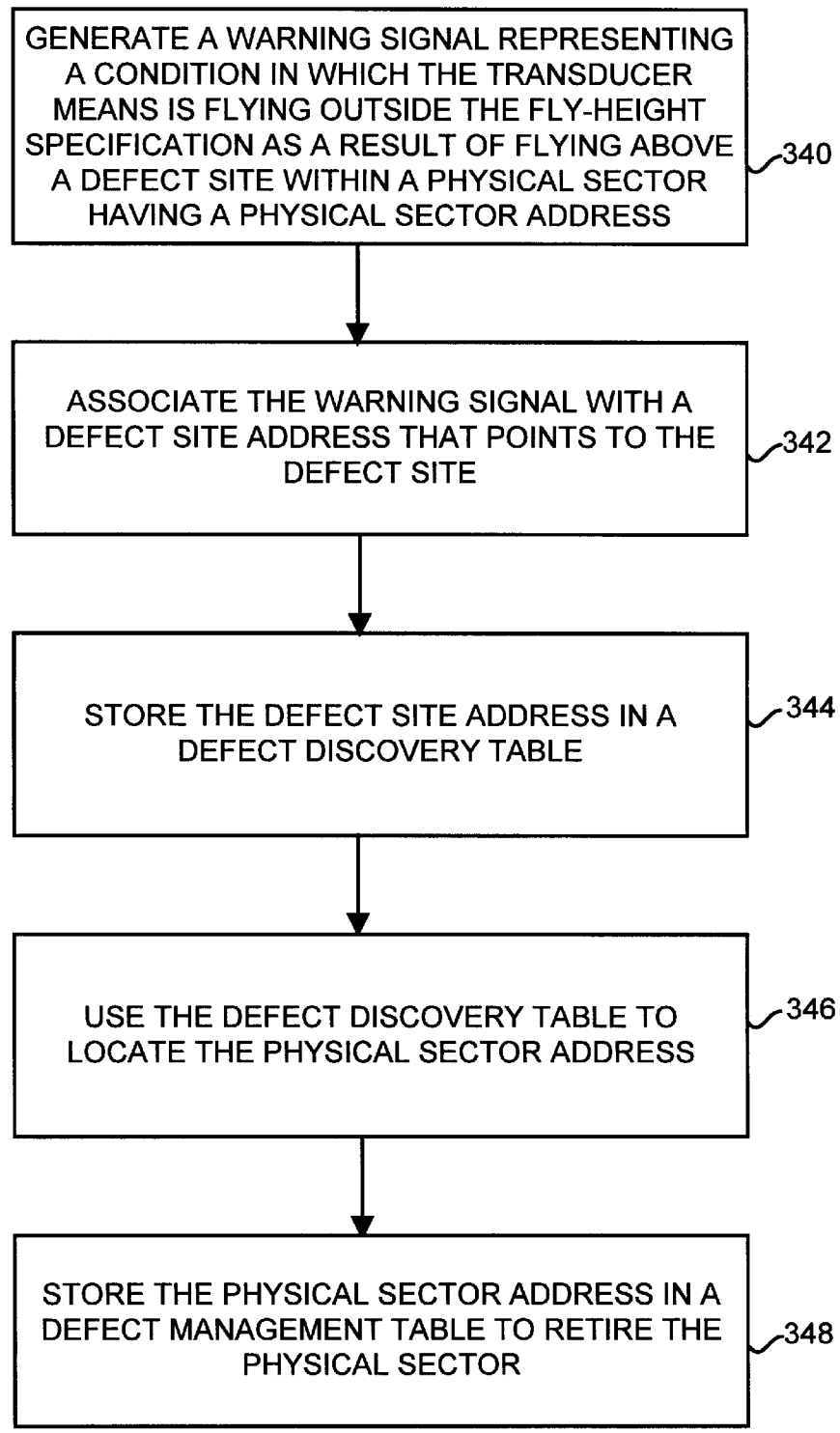
FIG. 18 is a flow chart illustrating a method of manufacturing a disk drive in accordance with an embodiment of the present invention.

FIG. 18 is a flow chart illustrating an embodiment of a method of manufacturing a disk drive, such as disk drive 30, that includes a transducer means, such as transducer head 64, designed to comply with a fly-height specification while flying above a disk, such as disk surface 52. Step 340 includes generating a warning signal, such as write condition signal 128, representing a condition in which the transducer means is flying outside the fly-height specification as a result of flying above a defect site within a physical sector having a physical sector address, such as data sector location 252. Step 342 includes associating the warning signal with a defect site address, such as data site location 240, that points to the defect site. Step 344 includes storing the defect site address in a defect discovery table. Step 346 includes using the defect discovery table to locate the physical sector address. Step 348 includes storing the physical sector address in a defect management table to retire the physical sector.

Figure 19:
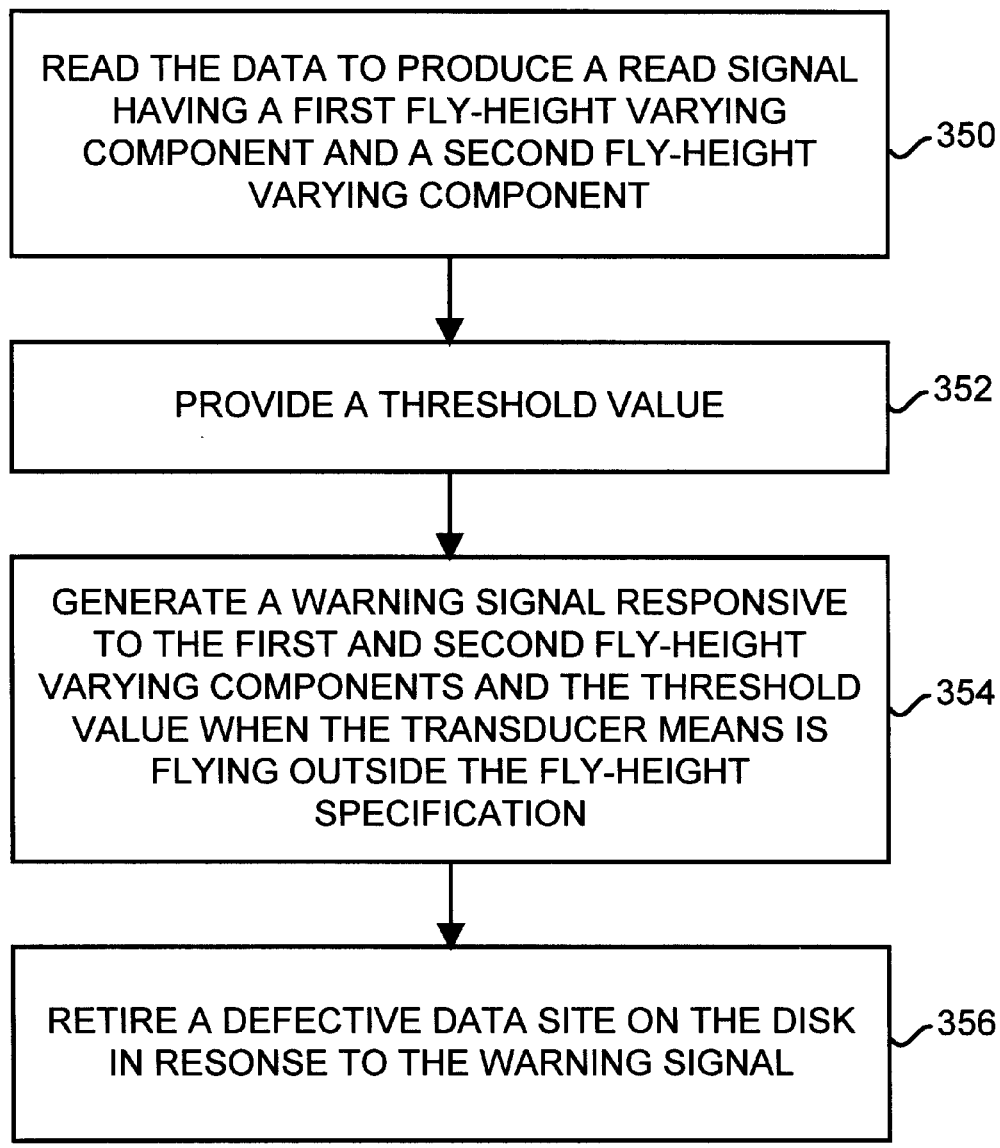
FIG. 19 is a flow chart illustrating a method of retiring a defective data site on a disk in a disk drive in accordance with an embodiment of the present invention.

FIG. 19 is a flow chart illustrating one exemplary embodiment of a method of retiring a defective data site on a disk, such as disk surface 52, in a disk drive, such as disk drive 30. The disk has a data region for storing data, such as servo sectors 190A–190C storing automatic gain control and servo burst information. The disk drive includes a transducer means, such as transducer head 64, designed to comply with a fly-height specification while flying above the disk. Step 350 includes reading the data stored in the data region to produce a read signal, such as read signal 94, having a first fly-height varying component and a second fly-height varying component. Steps 352 includes providing a threshold value, such as high-fly threshold 154. Step 354 includes generating a warning signal, such as write condition signal 128, responsive to the first and second fly-height varying components and the threshold value when the transducer means is flying outside the fly-height specification. Step 356 includes retiring the defective data site on the disk in response to the warning signal.

We claim:

1. A method of manufacturing a disk drive that includes a transducer means designed to comply with a fly-height specification while flying above a disk, the method comprising the steps of:

generating a warning signal representing a condition in which the transducer means is flying outside the fly-height specification as a result of flying above a defect site within a physical sector having a physical sector address;

associating the warning signal with a defect site address that points to the defect site;

storing the defect site address in a defect discovery table;

using the defect discovery table to locate the physical sector address; and storing the physical sector address in a defect management table to retire the physical sector.

2. The method of claim 1 wherein the disk includes a data region for storing data, the method further includes the steps of:

reading the data stored in the data region to produce a read signal;

providing a threshold value;

wherein the warning signal is responsive to the read signal and the threshold value.

3. The method of claim 2 wherein the read signal has a first fly-height varying component and a second fly-height varying component, and the warning signal is responsive to the first and second fly-height varying components and the threshold value.

4. The method of claim 3 wherein the first fly-height varying component includes an area component and the second fly-height varying component includes a peak component.

5. The method of claim 3 wherein the first fly-height varying component includes a first frequency component and the second fly-height varying component includes a second frequency component.

6. The method of claim 3 wherein the step of generating a warning signal further includes:

producing a fly-height representing signal responsive to the first and second fly-height varying components; and comparing the fly-height representing signal and the threshold value to generate the warning signal.

7. The method of claim 6 wherein the fly-height representing signal is a ratio of the first fly-height varying component and the second fly-height varying component.

8. The method of claim 2 wherein the data region is a servo sector and the data includes servo information.

9. The method of claim 2 wherein the data region is a servo sector and the data includes automatic gain control information.

10. The method of claim 2 wherein the data region is a user data segment and the data is a predetermined data pattern.

11. The method of claim 2 wherein the data region includes a servo sector and a user data segment, the data is servo information stored in the servo sector, the method further includes the steps of:

writing a known data pattern in the user data segment;

reading the user data segment to recover the data pattern; and detecting the defect site address by comparing the recovered data pattern to the known data pattern.

12. A method of retiring a defective data site on a disk in a disk drive, the disk having a data region for storing data, the disk drive including a transducer means designed to comply with a fly-height specification while flying above the disk, the method comprising the steps of:

reading the data stored in the data region to produce a read signal having a first. fly-height varying component and a second fly-height varying component;

providing a threshold value;

generating a warning signal responsive to the first and second fly-height varying components and the threshold value, wherein the warning signal is indicative of when the transducer means is flying outside the fly-height specification due to the transducer flying over the defective data site:

retiring the defective data site on the disk in response to the warning signal.

13. The method of claim 12 wherein the first fly-height varying component includes an area component of the read signal and the second fly-height varying component includes a peak component of the read signal.

14. The method of claim 12 wherein the first fly-height varying component includes a first frequency component and the second fly-height varying component includes a second frequency component.

15. The method of claim 12 wherein the step of generating a warning signal further includes:

producing a fly-height representing signal responsive to the first and second fly-height varying components; and comparing the fly-height representing signal and the threshold value to generate the warning signal.

16. The method of claim 15 wherein the fly-height representing signal is a ratio of the first fly-height varying component and the second fly-height varying component.

17. The method of claim 12 wherein the data includes servo information.

18. The method of claim 12 wherein the data includes automatic gain control information.

19. The method of claim 12 wherein the defective data site is a physical sector having a physical sector address, the method further includes the steps of:

associating the warning signal with the physical sector address; and storing the physical sector address in a defect management table to retire the physical sector.

20. The method of claim 19 wherein the warning signal represents a condition in which the transducer means is flying outside the fly-height specification as a result of flying above a defect site within the physical sector, the method further includes the steps of:

associating the warning signal with a defect site address that points to the defect site;

storing the defect site address in a defect discovery table; and using the defect discovery table to locate the physical sector address.

21. The method of claim 12 wherein the data region includes a servo sector and a user data segment, the data is servo information stored in the servo sector, the method further includes the steps of:

writing a known data pattern in the user data segment;

reading the user data segment to recover the data pattern; and detecting the defect site address by comparing the recovered data pattern to the known data pattern.

22. A disk drive comprising:

a disk having a data region for storing data;

a transducer means designed to comply with a fly-height specification while flying above the disk, the transducer means reading the data to produce a read signal having a first fly-height varying component and a second fly-height varying component;

means for providing a threshold value;

means for generating a warning signal responsive to the first and second fly-height varying components and the threshold value, wherein the warning signal is indicative of when the transducer means is flying outside the fly-height specification due to the transducer flying over the defective data site;

means responsive to the warning signal for retiring the defective data site on the disk.

23. The disk drive of claim 22 wherein the first fly-height varying component includes an area component of the read signal and the second fly-height varying component includes a peak component of the read signal.

24. The disk drive of claim 22 wherein the first fly-height component includes a first frequency component and the second fly-height component includes second frequency component.

25. The disk drive of claim 22 wherein the means for generating a warning signal further includes:

means for producing a fly-height representing signal responsive to the first and second fly-height varying components; and means for comparing the fly-height representing signal and the threshold value to generate the warning signal.

26. The disk drive of claim 23 wherein the fly-height representing signal is a ratio of the first fly-height varying component and the second fly-height varying component.

27. The disk drive of claim 22 wherein the data includes servo information.

28. The disk drive of claim 22 wherein the data includes automatic gain control information.

29. The disk drive of claim 22 wherein the defective data site is a physical sector having a physical sector address, the disk drive further comprises:

means for associating the warning signal with the physical sector address; and means for storing the physical sector address in a defect management table to retire the physical sector.

30. The disk drive of claim 29 wherein the warning signal represents a condition in which the transducer means is flying outside the fly-height specification as a result of flying above a defect site within the physical sector, the disk drive further comprises:

means for associating the warning signal with a defect site address that points to the defect site;

means for storing the defect site address in a defect discovery table; and means for using the defect discovery table to locate the physical sector address.

\* \* \* \* \*